United States Patent
Maeda et al.

(10) Patent No.: US 11,962,653 B2
(45) Date of Patent: Apr. 16, 2024

(54) DEVICE MONITORING METHOD, DEVICE MONITORING APPARATUS, AND RECORDING MEDIUM FOR TRANSMITTING MESSAGES CONTAINING DEVICE CONTROL COMMANDS BASED ON PREDETERMINED CONDITIONS

(71) Applicant: PANASONIC INTELLECTUAL PROPERTY CORPORATION OF AMERICA, Torrance, CA (US)

(72) Inventors: Manabu Maeda, Osaka (JP); Tomoyuki Haga, Nara (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 22 days.

(21) Appl. No.: 17/512,028

(22) Filed: Oct. 27, 2021

(65) Prior Publication Data
US 2022/0053055 A1 Feb. 17, 2022

Related U.S. Application Data

(63) Continuation of application No. PCT/JP2020/038186, filed on Oct. 8, 2020.

(30) Foreign Application Priority Data

Oct. 9, 2019 (JP) ................................. 2019-186260

(51) Int. Cl.
*H04L 67/125* (2022.01)
*H04L 12/66* (2006.01)

(52) U.S. Cl.
CPC ............ *H04L 67/125* (2013.01); *H04L 12/66* (2013.01)

(58) Field of Classification Search
CPC .............................. H04L 12/66; H04L 67/125
(Continued)

(56) References Cited

U.S. PATENT DOCUMENTS

| 2006/0059552 A1* | 3/2006 | Aoki ....................... H04L 61/25 726/13 |
| 2006/0168072 A1* | 7/2006 | Park ..................... G06Q 10/107 709/206 |

(Continued)

FOREIGN PATENT DOCUMENTS

JP 4082613 4/2008

OTHER PUBLICATIONS

International Search Report (ISR) from International Searching Authority (Japan Patent Office) in International Pat. Appl. No. PCT/JP2020/038186, dated Dec. 28, 2020, together with an English language translation.

(Continued)

*Primary Examiner* — David P Zarka
(74) *Attorney, Agent, or Firm* — Greenblum & Bernstein, P.L.C.

(57) ABSTRACT

A device monitoring method includes: receiving a message transmitted from a first device to a second device and addressed to the second device; determining whether the message contains a device control command for controlling the second device; if the message contains the device control command, further determining whether to transmit the message to the second device based on a predetermined condition; and when the message is determined to be transmitted to the second device, transmitting the message to the second device. The predetermined condition includes a first condition that the first device is registered as a device having a predetermined function in a device list containing information about whether each of the devices is a device having the (Continued)

predetermined function. The message is determined to be transmitted to the second device when the predetermined condition is satisfied.

18 Claims, 35 Drawing Sheets

(58) Field of Classification Search
USPC .......................................................... 709/218
See application file for complete search history.

(56) References Cited

U.S. PATENT DOCUMENTS

| | | | | |
|---|---|---|---|---|
| 2012/0013927 | A1* | 1/2012 | Asai | ...................... G06F 3/1226 358/1.16 |
| 2012/0310378 | A1* | 12/2012 | Smith | ...................... H04L 41/12 700/79 |
| 2013/0247033 | A1* | 9/2013 | Sawhney | ................. G06F 21/74 718/1 |
| 2014/0111689 | A1* | 4/2014 | Kim | .................... H04N 5/44504 348/563 |
| 2014/0244827 | A1* | 8/2014 | Mccoy | ................ H04L 12/2827 709/224 |
| 2019/0373081 | A1* | 12/2019 | Jung | ..................... H04W 88/16 |
| 2022/0338013 | A1* | 10/2022 | Maeda | .................... H04L 12/28 |

OTHER PUBLICATIONS

Extended European Search Report (EESR) from European Patent Office (EPO) in European Patent Appl. No. 20873835.1, dated Nov. 3, 2022.

* cited by examiner

| No. | Identifier (MAC address) | Device type |
|---|---|---|
| 1 | xx:xx:xx:xx:xx:xx | Appliance |
| 2 | yy:yy:yy:yy:yy:yy | Non-appliance |
| 3 | zz:zz:zz:zz:zz:zz | Appliance |

FIG. 10

| No. | Identifier (MAC address) | Device type | Connection port |
|---|---|---|---|
| 1 | xx:xx:xx:xx:xx:xx | Appliance | Appliance |
| 2 | yy:yy:yy:yy:yy:yy | Non-appliance | IT device |
| 3 | zz:zz:zz:zz:zz:zz | Appliance | Appliance |

FIG. 11

| No. | Identifier (MAC address) | Device type | Connection port | Communication allowance flag |
|---|---|---|---|---|
| 1 | xx:xx:xx:xx:xx:xx | Appliance | Appliance | |
| 2 | yy:yy:yy:yy:yy:yy | Non-appliance | IT device | |
| 3 | zz:zz:zz:zz:zz:zz | Appliance | Appliance | |
| 4 | ab:ab:ab:ab:ab:ab | Appliance | IT device | Y |
| 5 | cd:cd:cd:cd:cd:cd | Non-appliance | Appliance | N |

FIG. 16

| State No. | Device No. 1 | Device No. 2 | Resident |
|---|---|---|---|
| Now | ON | ON | 2F |
| 1 | ON | OFF | 1F |
| 2 | OFF | OFF | Out |
| 3 | OFF | ON | Bedroom |

DEVICE MONITORING METHOD, DEVICE MONITORING APPARATUS, AND RECORDING MEDIUM FOR TRANSMITTING MESSAGES CONTAINING DEVICE CONTROL COMMANDS BASED ON PREDETERMINED CONDITIONS

CROSS REFERENCE TO RELATED APPLICATIONS

This is a continuation application of PCT International Application No. PCT/JP2020/038186 filed on Oct. 8, 2020, designating the United States of America, which is based on and claims priority of Japanese Patent Application No. 2019-186260 filed on Oct. 9, 2019. The entire disclosures of the above-identified applications, including the specifications, drawings and claims are incorporated herein by reference in their entirety.

FIELD

The present disclosure relates to a device monitoring method, a device monitoring apparatus, and a recording medium.

BACKGROUND

In recent years, devices such as electronic control units in vehicles, appliances in homes, equipment in buildings, and manufacturing devices in factories have begun to be connected to local networks in vehicles or buildings and to the Internet through routers and the like. Functions such as remote control, status monitoring, and linking of devices in a building are realized by connecting these devices to the Internet. However, cyberattacks targeting such connected devices are occurring. In modern cyberattacks, routers, personal computers, and smartphones are being hijacked and forced to participate in attacks on other servers on the Internet. However, the fact that routers, personal computers, and smartphones can be hijacked means that an attacker can also attack devices in a car or a building.

The method disclosed in Patent Literature (PTL) 1 is an example of a security measure against attacks on devices connected to a network that is restricted to a certain space, such as in a car or a building (a LAN (Local Area Network) or the like). According to the method of PTL 1, it is possible to restrict communication between devices at any desired time by having a countermeasure device determine whether packets are passed or discarded in communication that is completed within a network in a car or building. This makes it possible, for example, to restrict certain communication services in a network.

CITATION LIST

Patent Literature

PTL 1: Japanese Patent No. 4082613

SUMMARY

Technical Problem

However, the method disclosed in PTL 1 requires an administrator to input data serving as criteria for determining whether packets are passed or discarded (restriction criteria) into the countermeasure device, and thus in a network without an administrator, the network may not be protected because data serving as the determination criteria cannot be input. Additionally, it may not be possible to protect the network until the data serving as the determination criteria is input by the administrator. In other words, there is room for improvement in security measures against attacks on devices.

To solve the above-described problem, the present disclosure provides a device monitoring method having improved security measures.

Solution to Problem

A device monitoring method according to one aspect of the present disclosure is a device monitoring method performed in a network system, the network system having a plurality of devices including a first device and a second device connected to a communication network. The device monitoring method includes: receiving a message addressed to the second device from the first device, the message being transmitted from the first device to the second device; determining whether or not the message received from the first device is a message containing a device control command that controls the second device; determining whether or not to transmit the message to the second device based on a predetermined condition, when the message is the message containing the device control command; and transmitting the message to the second device, when the message is determined to be transmitted to the second device. The predetermined condition includes a first condition that the first device is registered as a device having a predetermined function in a device list and the device list contains information about whether or not each of the plurality of devices is a device having the predetermined function. In the determining whether or not to transmit the message to the second device, it is determined to transmit the message when the predetermined condition is satisfied.

A device monitoring apparatus according to one aspect of the present disclosure is a device monitoring apparatus in a network system, the network system having a plurality of devices including a first device and a second device connected to a communication network. The device monitoring apparatus includes: a receiver that receives a message addressed to the second device from the first device, the message being transmitted from the first device to the second device; a first determiner that determines whether or not the message received from the first device is a message containing a device control command that controls the second device; a second determiner that determines whether or not to transmit the message to the second device based on a predetermined condition, when the message is the message containing the device control command; and a transmitter that transmits the message to the second device, when the second determiner determines that the message is to be transmitted to the second device. The predetermined condition includes a first condition that the first device is registered as a device having a predetermined function in a device list and the device list contains information about whether or not each of the plurality of devices is a device having the predetermined function. The second determiner determines to transmit the message to the second device when the predetermined condition is satisfied.

A recording medium according to one aspect of the present disclosure is a non-transitory computer-readable recording medium having a program recorded thereon for causing a computer to execute the above-described device monitoring method.

Advantageous Effects

According to the present disclosure, a device monitoring method and the like having improved security measures can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is a diagram illustrating an example of a device list according to Embodiment 2.

FIG. 11 is a diagram illustrating another example of a device list according to Embodiment 2.

FIG. 16 is a diagram illustrating an example of a state list according to Embodiment 3.

DESCRIPTION OF EMBODIMENTS

Figure 1:
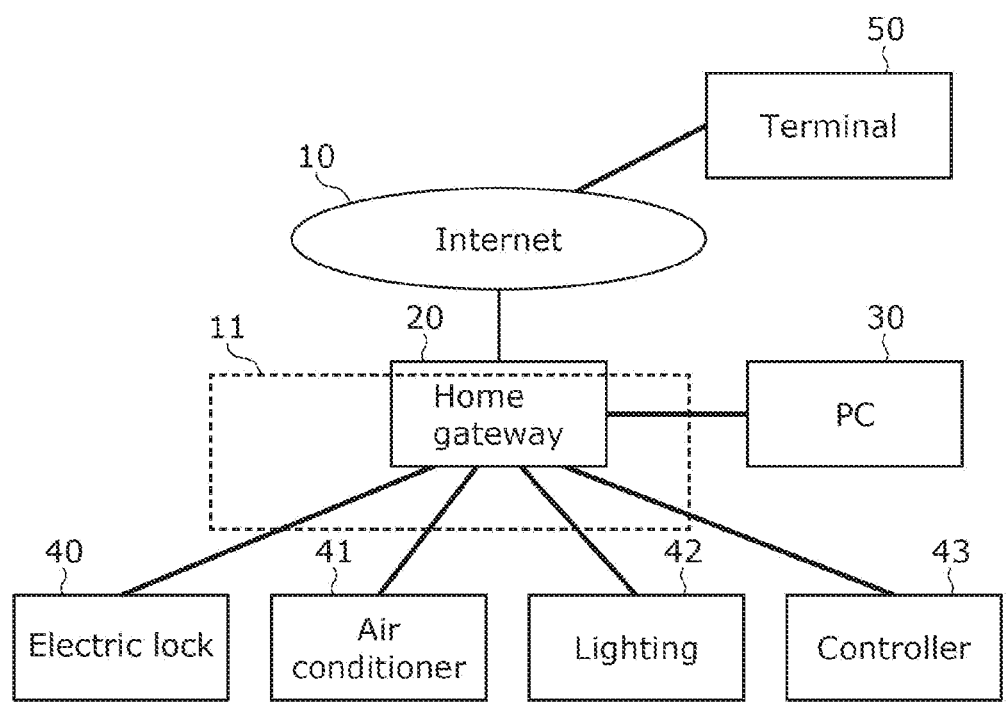
FIG. 1 is a diagram illustrating the overall configuration of a device control command monitoring system according to Embodiment 1.

A device monitoring method according to one aspect of the present disclosure is a device monitoring method performed in a network system, the network system having a plurality of devices including a first device and a second device connected to a communication network. The device monitoring method includes: receiving a message addressed to the second device from the first device, the message being transmitted from the first device to the second device; determining whether or not the message received from the first device is a message containing a device control command that controls the second device; determining whether or not to transmit the message to the second device based on a predetermined condition, when the message is the message containing the device control command; and transmitting the message to the second device, when the message is determined to be transmitted to the second device. The predetermined condition includes a first condition that the first device is registered as a device having a predetermined function in a device list and the device list contains information about whether or not each of the plurality of devices is a device having the predetermined function. In the determining whether or not to transmit the message to the second device, it is determined to transmit the message when the predetermined condition is satisfied.

This makes it possible to suppress situations where, in the communication network, the message containing the device control command is transmitted to the second device from a device not having the predetermined function. For example, when the device not having the predetermined function is a device which is susceptible to cyberattacks from the outside before a device having the predetermined function, situations in which a message is transmitted from the first device, which does not have the predetermined function, to the second device, can be suppressed. Additionally, even if, for example, a device that does not have the predetermined function is attacked in some way and impersonates a device having the predetermined function partway through, the impersonating device can be determined to be a device not having the predetermined function based on the device list. Accordingly, a device monitoring method having improved security measures can be provided.

Additionally, for example, the predetermined condition may further include a second condition that one of an operating state of the second device after being controlled by the device control command and an operating state of the second device before being controlled by the device control command is a pre-set operating state, and in the determining whether or not to transmit the message to the second device, it may be further determined to transmit the message when the second condition is satisfied.

Accordingly, when an improper device control command is transmitted and a device is controlled by the improper control command such that a state which does not normally occur actually occurs, the device control command can be detected as being improper. For example, this increases the possibility that an improper device control command can be detected even if information pertaining to the device, included in the message, has been forged by an attacker.

Additionally, for example, the device monitoring method may further include updating the operating state of the second device in a state list to the operating state of the second device after being controlled by the device control command, when the second condition is satisfied.

This makes it possible to update the state list to the newest state when the second condition is satisfied. For example, the state list updated to the newest state can be used when determining whether or not the second condition is satisfied, and thus the determination can be made efficiently.

Additionally, for example, the plurality of devices may be installed in a structure, and the second condition may further include that a user is in a predetermined room among a plurality of rooms in the structure at a point in time of the determining whether or not to transmit the message to the second device.

This makes it possible to detect that a device control command is improper also taking into account the state of the user. For example, a state that does not normally occur, such as a device operating in a room where no user is present, can be more accurately determined.

Additionally, for example, in the determining whether or not to transmit the message to the second device, it may be further determined whether or not the second device is a device having the predetermined function when the first condition is not satisfied, and it may be determined to transmit the message to the second device when the second device is not a device having the predetermined function.

Through this, when the second device does not have the predetermined function, the message from the first device is transmitted to the second device. In other words, situations where messages are not transmitted to the second device any more than is necessary can be suppressed. The second device can operate in accordance with the device control command.

Additionally, for example, the predetermined condition may further include a third condition that the first device is connected to a first connection port to which a device having the predetermined function is connected, and in the determining whether or not to transmit the message to the second device, it may be further determined to transmit the message to the second device when the third condition is satisfied.

Through this, when the first device is connected to the first connection port, i.e., when the first device is connected to a connection port to which a device having the predetermined function is connected, the message from the first device can be transmitted to the second device. As such, the second device can be operated when it is unlikely that the message contains an improper control command.

Additionally, for example, in the determining whether or not to transmit the message to the second device, it may be further determined whether or not the first device is a device that is allowed to communicate with the second device when the third condition is not satisfied, and it may be determined to transmit the message to the second device when the first device is a device that is allowed to communicate with the second device.

Through this, the message from the first device can be transmitted to the second device even when the first device is connected to a connection port aside from the first connection port. In other words, specific devices can communicate with each other regardless of the connection port. This makes a flexible network configuration possible.

Additionally, for example, the device monitoring method may further include classifying each of the plurality of devices as being or not being a device having the predetermined function, and in the classifying, a predetermined terminal may be notified when the second device is a device having the predetermined function and the second device is connected to a second connection port different from the first connection port or when the second device is not a device having the predetermined function and the second device is connected to the first connection port.

This makes it possible to notify the user in possession of the terminal when the combination of whether or not the device has the predetermined function and the connection port does not match.

Additionally, for example, the device monitoring method may further include classifying each of the plurality of devices as being or not being a device having the predetermined function. The first device may be connected to the first connection port and may be a device not having the predetermined function, the second device may be connected to the first connection port and may be a device having the predetermined function, a gateway may be connected to the second device and may be capable of executing processing of the determining whether or not to transmit the message to the second device, and in the classifying, the message may be transmitted from the first device to the second device via the gateway, when the first device and the second device are not allowed to communicate.

Through this, when the first device and the second device are not allowed to communicate, the message from the first device is input to the gateway. Whether or not to transmit the message to the second device is determined in the gateway, and thus situations in which an improper control command is transmitted to the second device can be suppressed.

Additionally, for example, the device monitoring method may further include generating the device list based on a response message responding to a determination message transmitted to each of the plurality of devices, the determination message being for determining whether or not each of the plurality of devices has the predetermined function.

Accordingly, the further determining whether or not to transmit the message can be performed efficiently by generating a device list in advance, for example.

Additionally, for example, the device monitoring method may further include updating the device list generated in the generating of the device list, and the updating of the device list may include: transmitting the determination message to each of the plurality of devices; receiving the response message in response to each of the determination messages; determining whether or not a determination result indicating whether or not a device has the predetermined function based on the response message matches registration information of the device in the device list; and updating a registration state of the device in the device list based on the determination result when it is determined that the determination result does not match the registration information.

Accordingly, even when a device has been added or deleted, the device list can be generated reflecting that fact.

Additionally, for example, the predetermined function may include supporting a predetermined communication protocol in the communication network.

This makes it possible to suppress situations where a device control command is transmitted to the second device from a device that does not support the predetermined communication protocol. For example, even if the first device impersonates a device that supports the predetermined communication protocol, an improper control command can be prevented from being transmitted to the second device if the first device being a device that does not support the predetermined communication protocol is registered in the device list in advance.

Additionally, for example, the predetermined communication protocol may be ECHONET Lite (registered trademark) or ZigBEE (registered trademark).

This makes it possible to suppress situations in which a device control command from a device that does not communicate using short-range wireless communication, such as ECHONET Lite or ZigBEE, is transmitted to the second device.

Additionally, for example, in the transmitting of the message to the second device, the message may be transmitted to the second device when the message is not a message containing the device control command.

Through this, the message from the first device is transmitted to the second device when the message is not a message containing a device control command. In other words, situations where messages are not transmitted to the second device any more than is necessary can be suppressed.

Additionally, for example, the second device may be a household appliance, and the device control command may be a command for controlling the household appliance.

Through this, situations in which an improper control command is transmitted to a household appliance can be suppressed. In other words, situations in which a household appliance performs improper operations due to an improper control command can be suppressed. Accordingly, in a communication network to which a household appliance is connected, security measures can be improved for that household appliance.

Additionally, for example, each of the plurality of devices may be provided in a home.

Through this, situations in which an improper control command is transmitted to a second device located in a home can be suppressed. In other words, situations in which the second device performs improper operations due to an improper control command can be suppressed. Accordingly, in a communication network to which a device located in a home is connected, security measures can be improved for that device.

Additionally, a device monitoring apparatus according to one aspect of the present disclosure is a device monitoring apparatus in a network system, the network system having a plurality of devices including a first device and a second device connected to a communication network. The device monitoring apparatus includes: a receiver that receives a message addressed to the second device from the first device, the message being transmitted from the first device to the second device; a first determiner that determines whether or not the message received from the first device is a message containing a device control command that controls the second device; a second determiner that determines whether or not to transmit the message to the second device based on a predetermined condition, when the message is the message containing the device control command; and a transmitter that transmits the message to the second device, when the second determiner determines that the message is to be transmitted to the second device. The predetermined condition includes a first condition that the first device is registered as a device having a predetermined function in a device list and the device list contains information about whether or not each of the plurality of devices is a device having the predetermined function. The second determiner determines to transmit the message to the second device when the predetermined condition is satisfied. Additionally, a program according to one aspect of the present disclosure is a program that causes a computer to execute the above-described device monitoring method.

This makes it possible to achieve the same effects as those of the above-described device monitoring method.

Note that these comprehensive or specific aspects may be realized by a system, a method, an integrated circuit, a computer program, or a non-transitory computer-readable recording medium such as a CD-ROM, or may be implemented by any desired combination of systems, devices, methods, integrated circuits, computer programs, and recording media. The program may be stored in advance in a recording medium, or may be supplied to the recording medium via a wide-area communication network including the Internet.

A device monitoring method and the like according to embodiments of the present disclosure will be described hereinafter with reference to the drawings. Note that the following embodiments describe preferred specific examples of the present disclosure. The numerical values, shapes, materials, constituent elements, arrangements and connection states of constituent elements, steps, orders of steps, and the like in the following embodiments are merely examples of the present disclosure, and are not intended to limit the present disclosure. The present disclosure is specified based on the content of the scope of claims. Accordingly, of the constituent elements in the following embodiments, constituent elements not denoted in the independent claims of the present disclosure are not absolutely necessary for solving the problem of the present disclosure, and will instead be described as constituent elements constituting more preferred forms.

Embodiment 1

1. System Configuration

A device control command monitoring system according to the present disclosure will be described, with reference to the drawings, as an embodiment of the present disclosure. The present embodiment describes a case in which an appliance (a household appliance) and a PC (personal computer) are connected to a network in a household (in a home) (home network 11). In other words, in the present embodiment, the device control command monitoring system can be said to be a home device monitoring system.

1.1 Overall Configuration of Device Control Command Monitoring System

FIG. 1 is a diagram illustrating the overall configuration of the device control command monitoring system according to the present embodiment.

As illustrated in FIG. 1, the device control command monitoring system includes Internet 10, home network 11, home gateway 20, PC 30, electric lock 40, air conditioner 41, lighting 42, controller 43, and terminal 50. Internet 10 is the general Internet. PC 30 is a common personal computer. Home gateway 20, PC 30, electric lock 40, air conditioner 41, lighting 42, and controller 43 are connected to home network 11, and when PC 30, electric lock 40, air conditioner 41, lighting 42, and controller 43 communicate with a home server or terminal 50, that communication is performed via home gateway 20. Home network 11 is an example of a communication network.

Home gateway 20 is connected to PC 30, as well as to electric lock 40, air conditioner 41, lighting 42, and controller 43, and has a function for mediating communication among the connected devices, or communication between the connected devices and Internet 10. Additionally, home gateway 20 manages information such as IP (Internet Protocol) addresses needed by PC 30, as well as by electric lock 40, air conditioner 41, lighting 42, and controller 43, to communicate, assigns IP addresses in response to requests from each device, provides notifications of the information necessary for communication, and the like. Additionally, home gateway 20 monitors whether or not improper device control commands are being transmitted to electric lock 40, air conditioner 41, and lighting 42, and blocks the improper device control commands as necessary. Home gateway 20 is an example of a device monitoring apparatus.

Electric lock 40, air conditioner 41, and lighting 42 are devices (appliances) that operate by receiving device control commands and interpreting the content of the received device control commands. Additionally, electric lock 40, air conditioner 41, and lighting 42 notify other devices of operating states of each of the devices or information detected by sensors provided in each of the devices (sensor information). For example, when a lock operation is performed, electric lock 40 transmits, to another device, a message of a notification that a locked state is in effect after the operation is complete. When an unlock operation is performed, too, a message of a notification that an unlocked state is in effect is transmitted to another device. Additionally, for example, air conditioner 41 notifies another device of an operating state such as an operating (on) state or a non-operating (off) state, an operation mode of air conditioner 41 (automatic/cooling/heating/dehumidifying/humidifying/fan/etc.), a set temperature set in air conditioner 41, information of a sensor installed in air conditioner 41 (room temperature/humidity/outside temperature), setting values of air conditioner 41 such as air direction and air volume, and the like. Additionally, for example, lighting 42 notifies another device of an operating state such as on or off, a setting value of a dimming function when such a dimming function is provided, and so on. These notifications may be made periodically, when a state or value changes, or when an inquiry arrives from another device.

Controller 43 is a device for controlling electric lock 40, air conditioner 41, and lighting 42, and controls electric lock 40, air conditioner 41, and lighting 42 by transmitting device control commands to those devices. Controller 43 may transmit the device control command in response to an input made by a user, or may automatically transmit the device control command in accordance with a condition set in advance. Controller 43 may be a dedicated apparatus on the communication network, or may be a terminal such as a smartphone.

Terminal 50 is a device connected to Internet 10 over a mobile phone network (wireless), and views the states of electric lock 40, air conditioner 41, and lighting 42 from outside the home, or receives notifications from home gateway 20. Note that home gateway 20 and terminal 50 may communicate by having a server (not shown) connected to Internet 10 and having home gateway 20 and terminal 50 communicate with the server via Internet 10. Terminal 50 is an example of a predetermined terminal. Terminal 50 may be a mobile terminal.

Although the present embodiment describes three devices, i.e., electric lock 40, air conditioner 41, and lighting 42, as devices that receive control commands and constituent elements of the device control command monitoring system, it is not absolutely necessary for the devices to be these three devices. Other devices may be used, and the number of devices is not limited to three. Furthermore, in addition to receiving device control commands, these devices may transmit device control commands to other devices, and may perform communication aside from device control commands. Additionally, these devices may communicate with a server (not shown) on Internet 10 via Internet 10.

Although terminal 50 is described as being connected to Internet 10, the configuration is not limited thereto. Terminal 50 may be connected to home gateway 20 directly and view the states of electric lock 40, air conditioner 41, and lighting 42, or receive notifications from home gateway 20.

1.2 Configuration of Home Gateway 20

Figure 2:
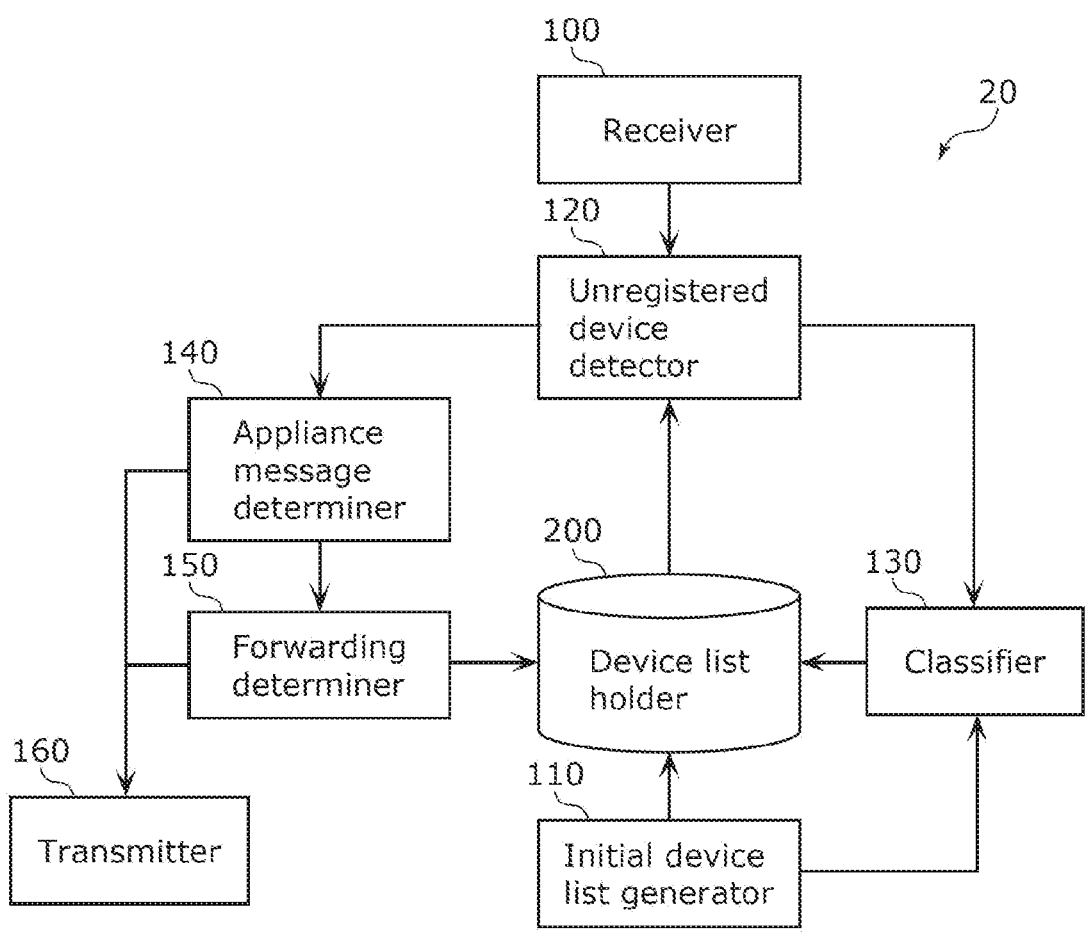
FIG. 2 is a block diagram of a home gateway according to Embodiment 1.

FIG. 2 is a block diagram of home gateway 20 according to the present embodiment.

As illustrated in FIG. 2, home gateway 20 includes receiver 100, initial device list generator 110, unregistered device detector 120, classifier 130, appliance message determiner 140, forwarding determiner 150, transmitter 160, and device list holder 200.

Note that these configurations are configurations indicating functions, and are realized by programs held in storage of home gateway 20 being read out and executed by a processor, predetermined data being held in the storage, or data being transmitted and received via an inputter/outputter, or by a combination of these.

Receiver 100 receives a communication message from Internet 10 or home network 11. Receiver 100 receives not only communication messages addressed to home gateway 20, but also all communication messages flowing in a communication line to which home gateway 20 is connected.

Initial device list generator 110 is connected to home network 11. Initial device list generator 110 performs processing for generating a device list when no device list is present in device list holder 200 or the device list has been deleted, such as at the time of the first startup, when an instruction has been made by the user to reset the device list held in device list holder 200, or the like. Initial device list generator 110 searches for devices connected to home network 11 and registers devices which have been found in the device list. Additionally, initial device list generator 110 requests classifier 130 to classify devices registered by initial device list generator 110. Although details will be given later, the device list includes information pertaining to a plurality of devices connected to home network 11. In the present embodiment, the device list includes information pertaining to PC 30, electric lock 40, air conditioner 41, lighting 42, and controller 43. The device list may further includes information pertaining to terminal 50 connected to home gateway 20.

Unregistered device detector 120 compares information pertaining to at least one of a transmission origin and a transmission destination of the communication message received by receiver 100 with the information registered in device list holder 200, and checks whether or not at least one of the transmission origin and the transmission destination of the communication message is a device registered in device list holder 200. If a device corresponding to at least one of the transmission origin and the transmission destination of the communication message is not registered in device list holder 200, unregistered device detector 120 requests classifier 130 to register a class of that device in device list holder 200.

Classifier 130 classifies each of the plurality of devices connected to home network 11 according to whether or not the device is a device having a predetermined function. The predetermined function is, for example, that the device supports a predetermined communication protocol in home network 11. In the present embodiment, classifier 130 classifies each of the plurality of devices connected to home network 11 as "appliance" or "non-appliance". Classifier 130 classifies, for example, a device capable of communication using a protocol for controlling appliances (an example of the predetermined communication protocol) as an appliance, and classifies a device not capable of communicating using the protocol for controlling appliances as a non-appliance. Note that the plurality of devices include, for example, at least one appliance.

Note that the predetermined communication protocol is a communication protocol for short-range wireless communication through communication between home gateway 20 and terminal 50, and is, for example, ECHONET Lite (registered trademark; the same applies hereinafter) or ZigBEE (registered trademark; the same applies hereinafter), but is not limited thereto. For example, in ECHONET Lite, classifier 130 registers a device that correctly responds to an inquiry message transmitted by home gateway 20 as an appliance, and registers a device that does not respond or responds incorrectly as a non-appliance.

Appliance message determiner 140 determines whether or not a received message received by receiver 100 is a message pertaining to the protocol for controlling appliances (an appliance message), and when the received communication message is determined to be an appliance message, requests forwarding determiner 150 to determine whether or not to transmit (forward) the message to the transmission destination. In, for example, the case of ECHONET Lite, the specifications state that communication is performed using the port having a UDP (User Datagram Protocol) port number 3610, and thus when determining whether or not the received message is an appliance message, appliance message determiner 140 may determine that the message is an appliance message when a transmission destination port number of the message is 3610. Furthermore, in ECHONET Lite, the specifications state that 0x1081 or 0x1082 is set for the first two bytes of the communication data, and thus appliance message determiner 140 may determine that the received message is an appliance message when the first two bytes of a data part of the received message are 0x1081 or 0x1082. Additionally, appliance message determiner 140 may perform the determination using a combination of the foregoing, or using different information.

In this manner, appliance message determiner 140 determines whether or not a communication message corresponds to a protocol assumed to be used by home gateway 20, based on the content of the communication message. When home gateway 20 supports a plurality of protocols, appliance message determiner 140 determines to which protocol the communication message corresponds. In this case, if it is determined that the communication message does not correspond to any protocol, appliance message determiner 140 determines that the message is unrelated to protocols for controlling appliances. Appliance message determiner 140 is an example of a first determiner.

When appliance message determiner 140 determines that a received message is an appliance message, forwarding determiner 150 determines whether or not to further transmit (forward) that message to a transmission destination denoted in the received message. The determination processing will be described in detail later. Forwarding determiner 150 is an example of a second determiner.

When the message received by receiver 100 is not an appliance message, or when forwarding determiner 150 has determined to forward the message, transmitter 160 transmits (forwards) the message to the transmission destination.

Figures 3, 4:
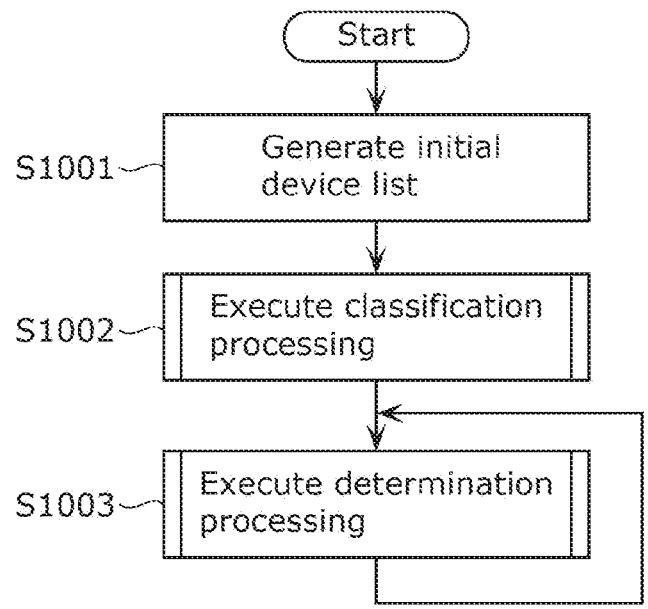
FIG. 3 is a diagram illustrating an example of a device list according to Embodiment 1.
FIG. 4 is a flowchart illustrating an example of main processing of the home gateway according to Embodiment 1.

Device list holder 200 holds information pertaining to the plurality of devices connected to home network 11 in list format as the device list. FIG. 3 is a diagram illustrating an example of the device list according to the present embodiment.

An identifier (e.g., a MAC (Media Access Control) address) and a device type as classified by classifier 130 are registered in association with each other in the device list, as illustrated in FIG. 3. Note that information aside from the MAC address and the device type may be registered, or information aside from a MAC address may be registered as the identifier, in the device list. In the device list, for example, an IP address may be registered, and if home gateway 20 has a plurality of communication ports for connecting to communication lines, the communication port to which the device is connected may be registered. Additionally, in the device list, whether the device only transmits, only receives, or both transmits and receives control messages for controlling appliances may be registered, and a detailed type such as whether the appliance is an electric lock, an air conditioner, lighting, a controller, or the like may be registered.

Although the foregoing describes classifier 130 as classifying the plurality of devices connected to home network 11 as appliances or non-appliances, the configuration is not limited thereto, and the devices may be classifies as devices that can or cannot be controlled by home gateway 20. Devices that cannot be controlled by home gateway 20 include, for example, a device for which a control method is not provided in home gateway 20. Devices that can be controlled by home gateway 20 are devices having functions which can be controlled by a control method provided in home gateway 20, and are an example of devices having a predetermined function. Such a device can also be called a device to be controlled by home gateway 20. Additionally, devices that cannot be controlled by home gateway 20 are devices lacking functions which can be controlled by a control method provided in home gateway 20, and are an example of devices not having a predetermined function.

Classifier 130 is not limited to classifying devices into two types, and may classify devices into three or more types. For example, when a plurality of devices supporting different protocols for controlling devices are connected to home network 11 and devices supporting the same protocol communicate with each other, classifier 130 may classify the devices according to the types of the protocols.

Note that the device list need not be generated if, for example, the plurality of devices includes only one appliance.

1.3 Operations of Device Control Command Monitoring System

Operations of the device control command monitoring system include the following processing.

(1) Main Processing
(2) Classification Processing
(3) Determination Processing

Each of these will be described hereinafter with reference to the drawings. Note that it is acceptable for the operations of the device control command monitoring system to include at least (3), the determination processing.

1.3.1 Operations in Main Processing

FIG. 4 is a flowchart illustrating an example of the main processing of home gateway 20 according to the present embodiment.

As illustrated in FIG. 4, first, if there are no devices registered in device list holder 200 at the time of startup, home gateway 20 generates the device list (an initial device list) using initial device list generator 110 (S1001). Initial device list generator 110 transmits, for example, an ARP (Address Resolution Protocol) message to all IP addresses in the same subnet in order to extract devices connected to home network 11, and registers devices that respond in device list holder 200.

Next, initial device list generator 110 requests classifier 130 to classify the devices registered in device list holder 200, and classifier 130 executes the classification processing (S1002).

Steps S1001 and S1002 can be called processing for initial settings.

After the classification processing is complete, home gateway receives a communication message and executes the determination processing (S1003). Home gateway 20 repeats the determination processing each time a single communication message is received.

Although the foregoing describes transmitting ARP messages and registering devices that respond in device list holder 200 when generating the device list, the configuration is not limited thereto, and for example, ICMP (Internet Control Message Protocol) Echo Messages may be transmitted, and the device list may be generated from response messages responding thereto.

1.3.2 Operations in Classification Processing

Figure 5:
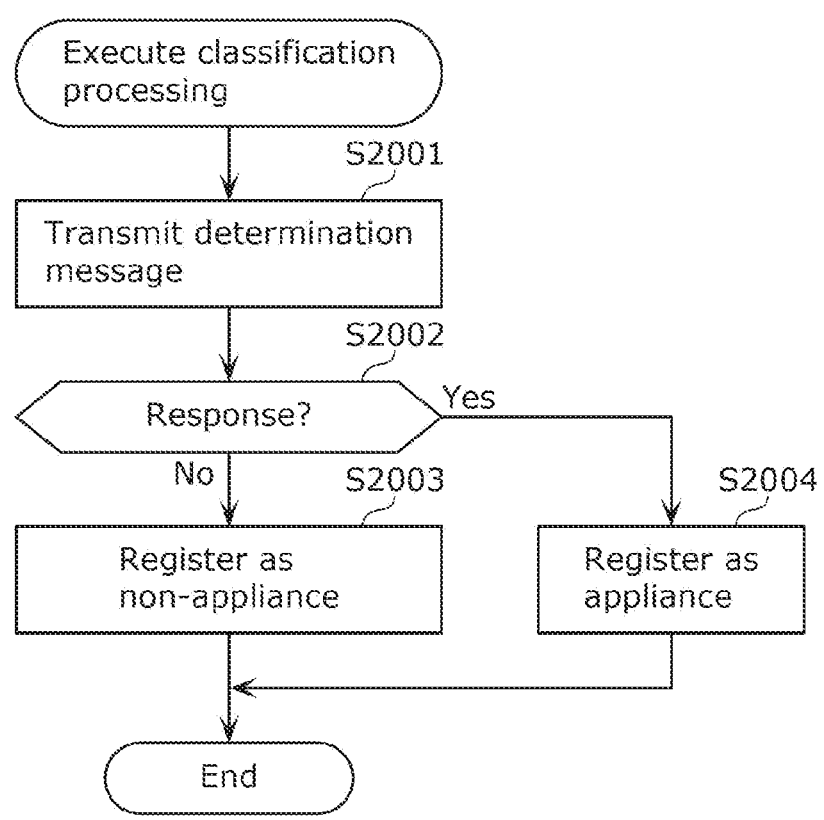
FIG. 5 is a flowchart illustrating an example of classification processing of a classifier according to Embodiment 1.

FIG. 5 is a flowchart illustrating an example of the classification processing of classifier 130 according to the present embodiment.

As illustrated in FIG. 5, first, in response to a request from initial device list generator 110 or unregistered device detector 120, classifier 130 transmits, to each of the plurality of devices, a message (a determination message) for determining whether or not communication is possible with the plurality of devices connected to home network 11 using a protocol for controlling appliances (S2001). Here, classifier 130 may transmit the determination message as a broadcast or multicast which can be received by unspecified devices connected to home network 11, or may transmit the determination message individually to devices registered in device list holder 200.

Next, classifier 130 determines whether or not a device that received the determination message has returned a response message (S2002). If the determination message has been transmitted through broadcast or multicast, classifier 130 waits for the response message until a set amount of time has passed following the transmission of the determination message, determines "response" for a device which has transmitted a response message, and determines "no response" for a device which has not transmitted a response message before the set amount of time has passed. On the other hand, if the determination message has been transmitted to devices individually, classifier 130 determines "response" if a response message is received, and determines "no response" if a response message is not received before a set amount of time has passed.

Classifier 130 determines that a device determined to have "no response" in step S2002 (No in S2002) is not an appliance, and registers "non-appliance" in device list holder 200 (S2003). Classifier 130 determines that a device determined to have "response" in step S2002 (Yes in S2002) is an appliance, and registers "appliance" in device list holder 200 (S2004). When registering "appliance" or "non-appliance" as the device type in the device list held by device list holder 200 in step S2003 or step S2004, if there is no information aside from the device type in the device list, classifier 130 registers that as well.

In this manner, classifier 130 generates the device list by transmitting, to each of the plurality of devices, a determination message for determining whether or not each of the plurality of devices is an appliance, and generates the device list on the basis of response messages responding to the determination messages. Steps S2001 to S2004 (S1002) are an example of generating a device list. Additionally, steps S2002 to S2004 are an example of classifying each of the plurality of devices according to whether or not the devices have a predetermined function (e.g., whether or not the devices are appliances).

1.3.3 Operations in Determination Processing

Figure 6:
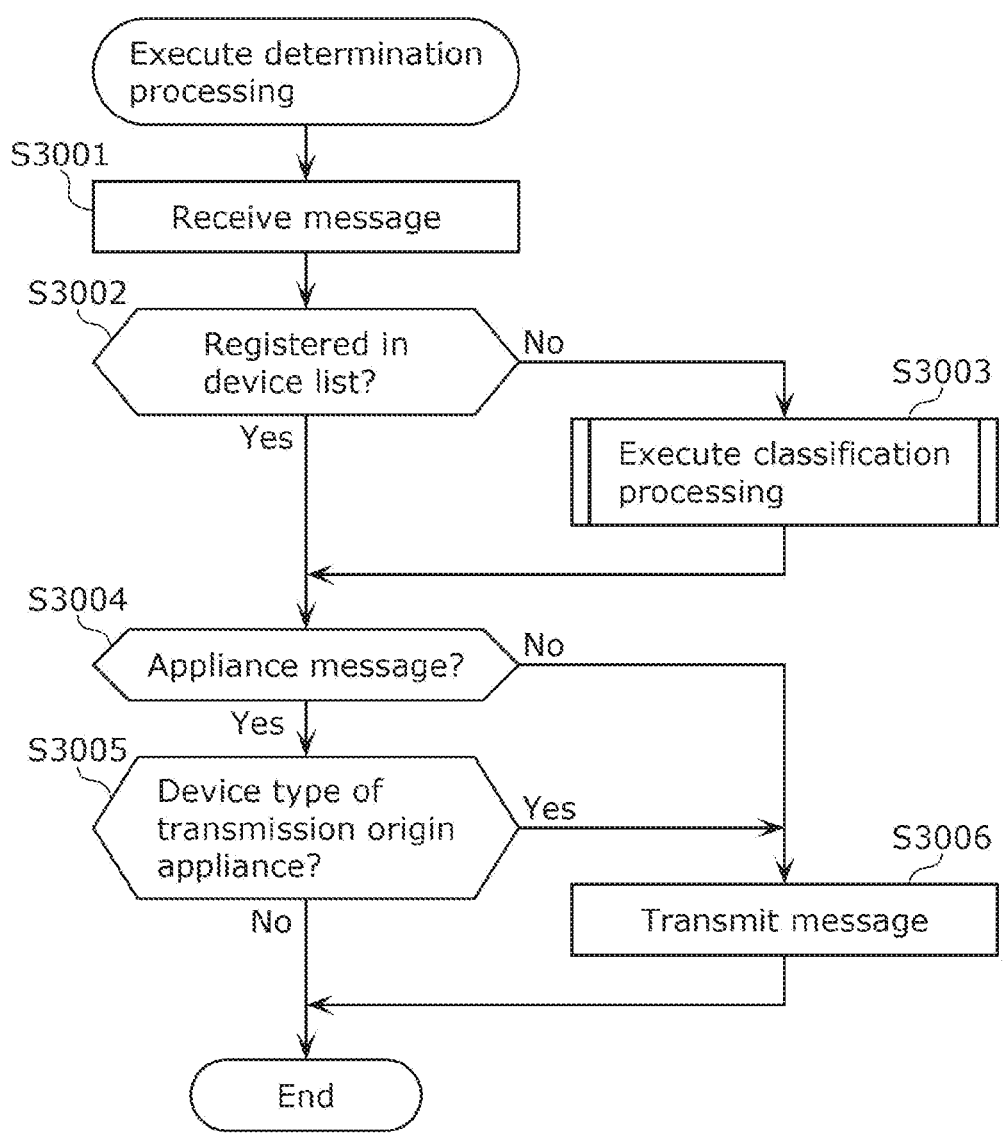
FIG. 6 is a flowchart illustrating an example of determination processing of the home gateway according to Embodiment 1.

FIG. 6 is a flowchart illustrating an example of the determination processing of home gateway 20 according to the present embodiment.

As illustrated in FIG. 6, first, receiver 100 receives a communication message (S3001). Receiver 100 receives, from a transmission origin device (an example of a first device), a communication message addressed to a transmission destination device (an example of a second device), the communication message being transmitted from the transmission origin device to the transmission destination device. Step S3001 is an example of receiving a message addressed to the second device from the first device.

Next, unregistered device detector 120 determines whether or not the device is registered in the device list of device list holder 200 based on information of the transmission origin device (MAC address, IP address, port number, and so on) in the received communication message (received message) (S3002).

If it is determined in step S3002 that the device is "not registered" (No in S3002), unregistered device detector 120 requests classifier 130 to perform the classification processing. Classifier 130 then executes the classification processing (S3003).

If it is determined in step S3002 that the device is "registered" (Yes in S3002), or it is determined that the device is "not registered" and the classification processing (S3003) has been executed, appliance message determiner 140 determines whether or not the received message is an appliance message (S3004). Appliance message determiner 140 executes the determination of step S3004, for example, based on whether or not the transmission destination port number in the received message is 3610, or whether or not the first two bytes of the data part of the communication message are 0x1081 or 0x1082.

If it is determined in step S3004 that the received message is an "appliance message" (Yes in S3004), appliance message determiner 140 requests forwarding determiner 150 to perform an additional determination. The received message being an "appliance message" means that the transmission destination device is an appliance and the message includes a device control command for controlling that appliance. Step S3004 is an example of determining whether or not the message received from the first device is a message containing a device control command that controls the second device. If it is determined in step S3004 that the received message is "not an appliance message" (No in S3004), appliance message determiner 140 requests transmitter 160 to transmit the message. A received message determined to be "not an appliance message" is a normal message, e.g., a message for communicating over a browser or the like, but is not limited thereto.

Forwarding determiner 150 obtains information on the device type of the transmission origin device of the received message from device list holder 200, and determines whether or not the device type of the transmission origin device is an appliance (S3005). If it is determined in step S3005 that the transmission origin device is an "appliance" (Yes in S3005), forwarding determiner 150 requests transmitter 160 to transmit the message. On the other hand, if it is determined in step S3005 that the transmission origin device is a "non-appliance" (No in S3005), forwarding determiner 150 ends the determination processing without transmitting the received message. Step S3005 is an example of determining whether or not to transmit the received message to the transmission destination device based on a predetermined condition. Whether or not the transmission origin device is an "appliance" is an example of a predetermined condition. For example, whether or not the transmission origin device is an "appliance" can be determined based on whether or not the first device is registered in the device list as being a device having the predetermined function. Note that the first device being registered in the device list as a device having the predetermined function is an example of a first condition. Additionally, the first condition being satisfied in step S3005 can be called a determination to transmit the received message.

Transmitter 160 transmits the message in response to the message transmission request from appliance message determiner 140 or forwarding determiner 150 (S3006), and then ends the determination processing. For example, transmitter 160 transmits the received message to the transmission destination device when forwarding determiner 150 has made a determination of Yes in step S3005. Step S3006 is an example of transmitting the message to the second device.

Although the foregoing describes home gateway 20 as requesting appliance message determiner 140 to determine whether or not the received message indicates an appliance after the classification processing (S3003) is executed, the configuration is not limited thereto, and home gateway 20 may end the determination processing after the classification processing and wait to receive the next message, or may notify the transmission origin of the received message of an error.

Additionally, although the foregoing describes unregistered device detector 120 as determining whether or not a device is registered in the device list based on the information of the transmission origin device of the received message, the configuration is not limited thereto, and whether or not the device is registered in the device list may be determined based on information of the transmission destination device of the received message, or may be determined based on device information of both the transmission destination and the transmission origin.

1.4 Effects of Embodiment 1

In the present embodiment, devices connected to home network 11 are classified as "appliances" or "non-appliances", and only an "appliance message" transmitted by an appliance is forwarded using home gateway 20. This can suppress situations in which an improper "appliance message", which is transmitted to an "appliance" device from a "non-appliance" device that among "appliances" and "non-appliances" is more susceptible to cyberattacks from the outside, is transmitted to the second device. In other words, a "non-appliance" can be prevented from improperly transmitting an "appliance message". Additionally, initial device list generator 110 generates the device list when home gateway 20 is started up, and the devices are classified as "appliances" or "non-appliances". Accordingly, even if a device is attacked in some way and is impersonating an "appliance" partway through, home gateway 20 can determine that the impersonating device is a "non-appliance" and prevent improper "appliance messages" from being transmitted from the impersonating device.

Embodiment 2

In Embodiment 1 of the present disclosure, home network 11 is a single network, a variety of devices are connected thereto, and home gateway 20 determines whether or not to forward device control commands based on the device type of the transmission origin device.

The present embodiment will describe a configuration in which home network 11 is divided into IT device network 12, to which PC 30 or terminal 50 (e.g., a mobile terminal such as a smartphone) are connected, and appliance network 13, to which appliances are connected, by home gateway 20.

A device control command monitoring system according to Embodiment 2 of the present disclosure will be described hereinafter.

2. System Configuration

A device control command monitoring system according to the present disclosure will be described, with reference to the drawings, as Embodiment 2 of the present disclosure. Note that the same reference signs will be used for constituent elements having the same functions as in Embodiment 1 of the present disclosure, and detailed descriptions thereof will be omitted.

2.1 Overall Configuration of Device Control Command Monitoring System

Figure 7:
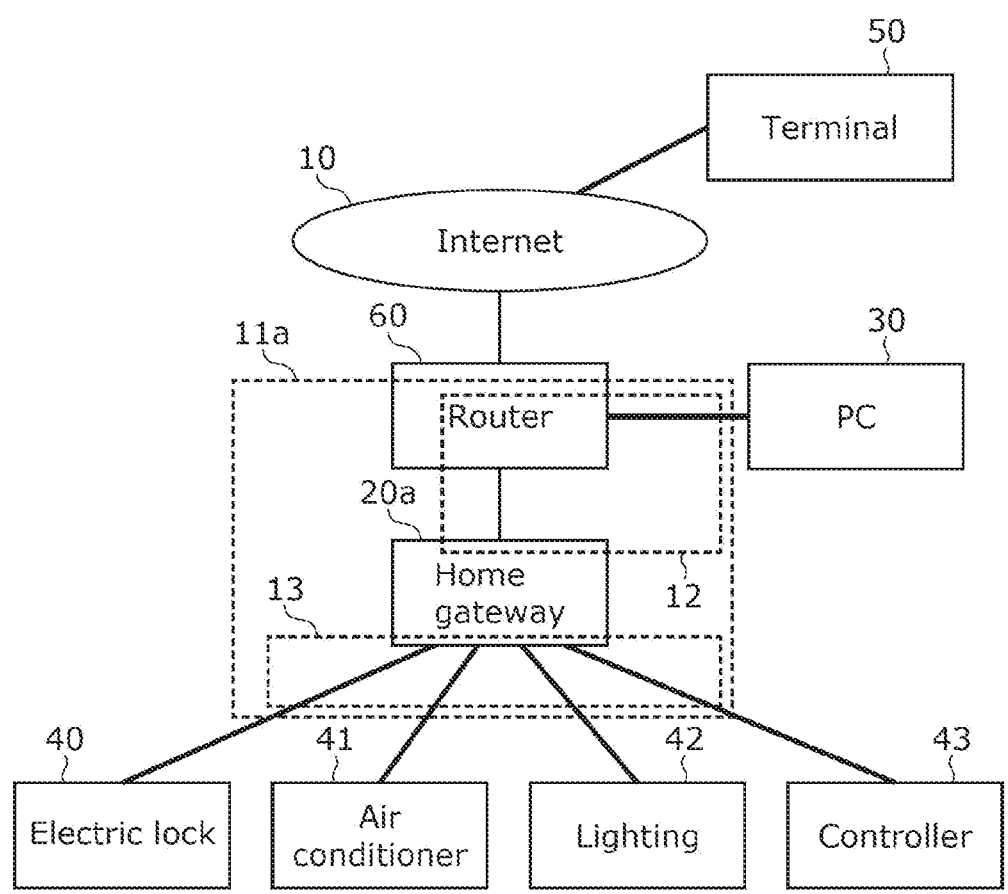
FIG. 7 is a diagram illustrating an example of the overall configuration of a device control command monitoring system according to Embodiment 2.

FIG. 7 is a diagram illustrating an example of the overall configuration of the device control command monitoring system according to the present embodiment.

As illustrated in FIG. 7, the device control command monitoring system may include Internet 10, home network 11a, IT device network 12, appliance network 13, home gateway 20a, PC 30, electric lock 40, air conditioner 41, lighting 42, controller 43, terminal 50, and router 60.

Electric lock 40, air conditioner 41, lighting 42, controller 43, and router 60 are connected to home gateway 20a, which mediates communication among those connected devices. Home gateway 20a has two types of connection ports, i.e., a connection port for connecting a communication line of IT device network 12 and a connection port for connecting a communication line of appliance network 13. In FIG. 7, there is one connection port for IT device network 12 (an IT device connection port) and four connection ports for appliance network 13 (appliance connection ports), with router 60 connected to the IT device connection port and appliances such as electric lock 40, air conditioner 41, lighting 42, and controller 43 connected to the appliance connection ports. Whether each connection port is an IT device connection port or an appliance connection port may be determined in advance, settable by a user, or determined automatically by home gateway 20a. As a method for automatic determination, for example, home gateway 20a may determine that a connection port to which a device classified by classifier 130 as an "appliance" is connected is an "appliance connection port"; or may determine that a connection port to which a device classified by classifier 130 as a "non-appliance" is an "IT device connection port"; or may determine, based on communication messages transmitted and received by each device, that a connection port to which a device transmitting and receiving appliance messages is connected is an "appliance connection port" and other connection ports are "IT device connection ports"; or may use a different method. Note that the "appliance connection port" is an example of a first connection port and the "IT device connection port" is an example of a second connection port.

Router 60 is a device for connecting Internet 10 to home network 11a. Home gateway 20a and PC 30 are connected to router 60, and home gateway 20a or PC 30 communicate via router 60 when communicating with a server on Internet 10. Terminal 50 may also be connected to router 60.

Figure 8:
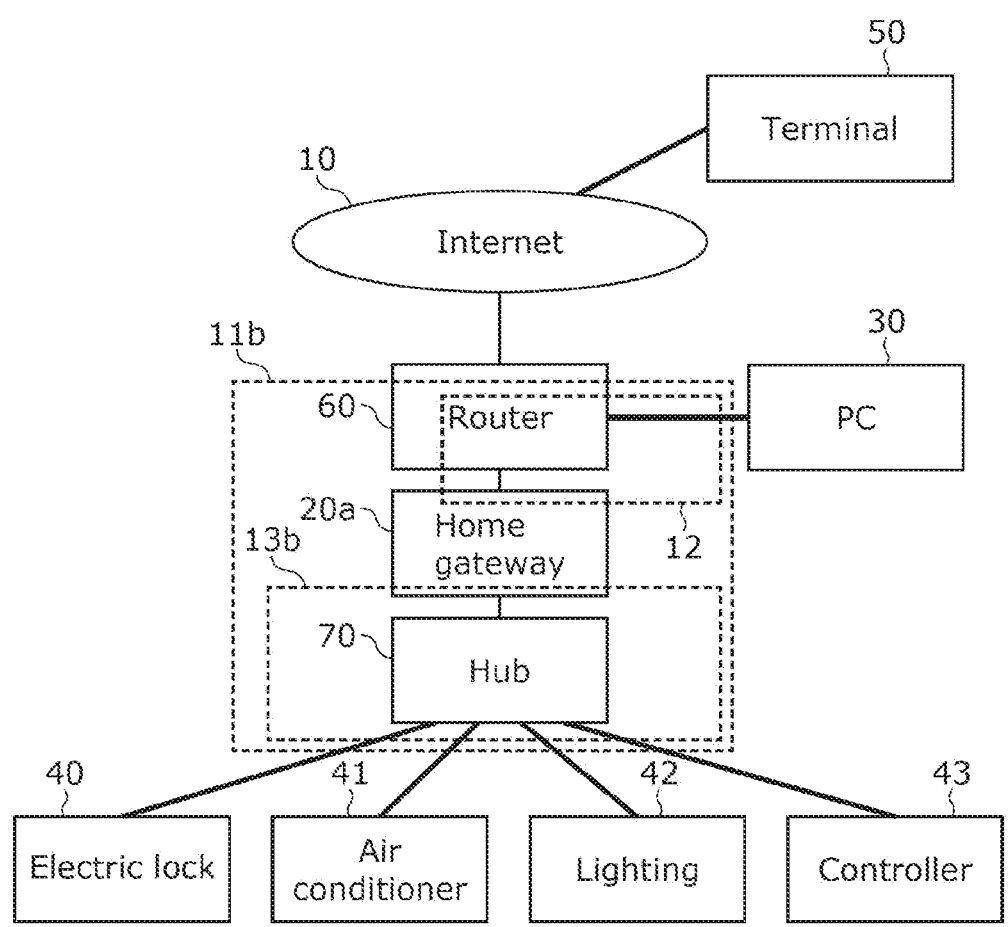
FIG. 8 is a diagram illustrating another example of the overall configuration of a device control command monitoring system according to Embodiment 2.

Note that the overall configuration of the device control command monitoring system according to the present embodiment is not limited to the configuration illustrated in FIG. 7. FIG. 8 is a diagram illustrating another example of the overall configuration of the device control command monitoring system according to the present embodiment.

As illustrated in FIG. 8, the device control command monitoring system may include Internet 10, home network 11b, IT device network 12, appliance network 13b, home gateway 20a, PC 30, electric lock 40, air conditioner 41, lighting 42, controller 43, terminal 50, router 60, and hub 70. The difference from FIG. 7 is whether each appliance is directly connected to home gateway 20a or connected via hub 70.

Router 60 and hub 70 are connected to home gateway 20a. Home gateway 20a has one IT device connection port and one appliance connection port, with router 60 connected to the IT device connection port and hub 70 connected to the appliance connection port. Whether each connection port is an IT device connection port or an appliance connection port may be determined in advance, settable by a user, or determined automatically by home gateway 20a.

Home gateway 20a, as well as electric lock 40, air conditioner 41, lighting 42, and controller 43, are connected to hub 70, which relays communication.

2.2 Configuration of Home Gateway 20a

Figure 9:
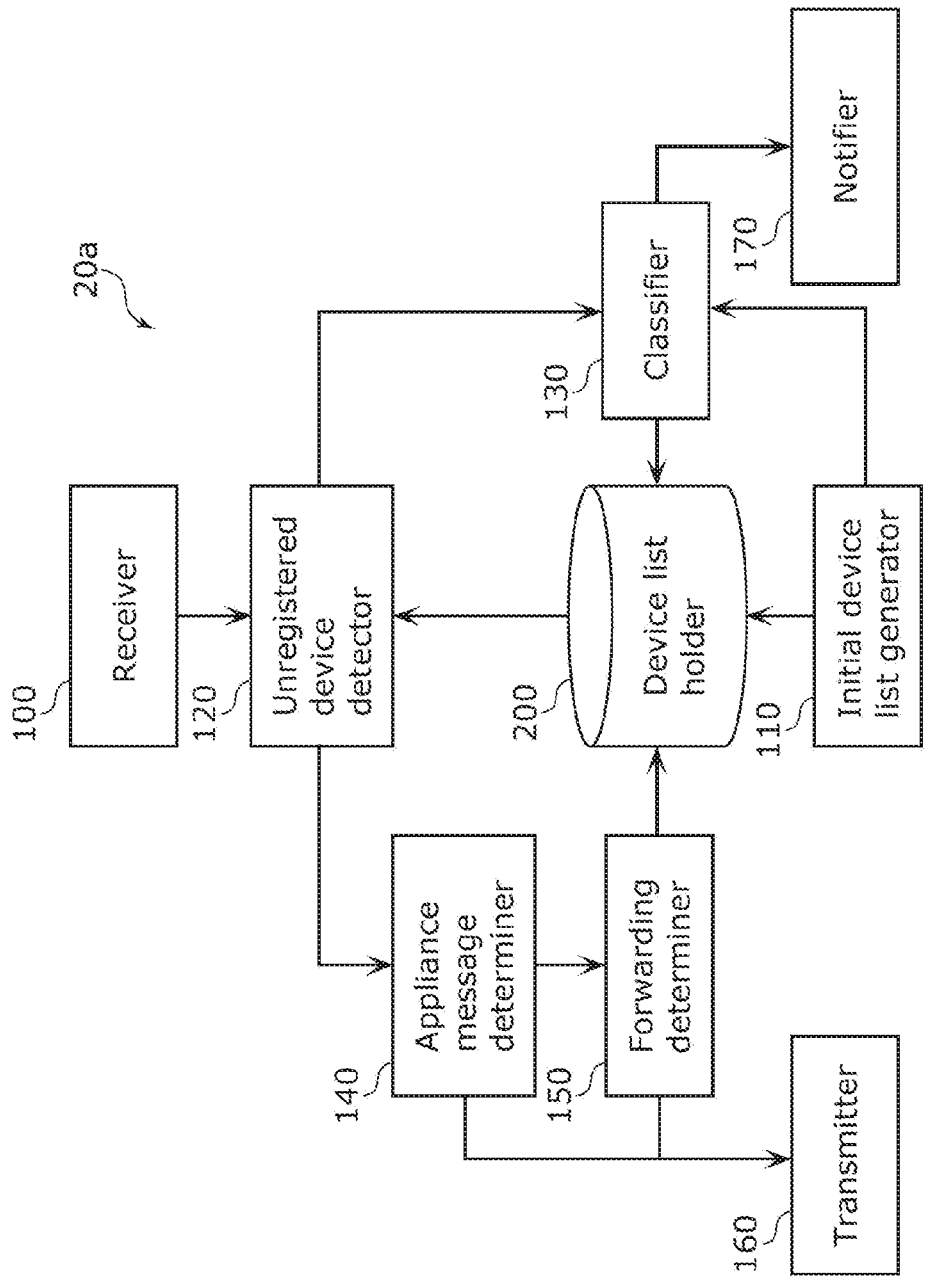
FIG. 9 is a block diagram of a home gateway according to Embodiment 2.

FIG. 9 is a block diagram of home gateway 20a according to the present embodiment. The same reference signs will be used for constituent elements having the same functions as in Embodiment 1, and detailed descriptions thereof will be omitted. Home gateway 20a includes receiver 100, initial device list generator 110, unregistered device detector 120, classifier 130, appliance message determiner 140, forwarding determiner 150, transmitter 160, notifier 170, and device list holder 200. In addition to home gateway 20 according to Embodiment 1, home gateway 20a includes notifier 170. Note that in the following, home networks 11a and 11b will simply be referred to as home network 11.

Like classifier 130 of Embodiment 1, classifier 130 classifies the devices connected to home network 11 as "appliance" or "non-appliance". Furthermore, classifier 130 according to the present embodiment determines whether or not a combination of the device type in the classification result and the connected connection port is correct, and if the combination is incorrect, notifies the user via notifier 170. For example, classifier 130 determines that a combination in which a device classified as "appliance" is connected to the "appliance connection port" and a combination in which a device classified as "non-appliance" is connected to the "IT device connection port" are correct combinations, and determines that a combination in which a device classified as "non-appliance" is connected to the "appliance connection port" and a combination in which a device classified as "appliance" is connected to the "IT device connection port" are incorrect combinations.

When appliance message determiner 140 determines that a received message is an appliance message, forwarding determiner 150 determines whether or not to transmit (forward) the received message to a transmission destination denoted in the received message using information indicating whether the connection port that received the communication message is the IT device connection port or the appliance connection port.

Notifier 170 notifies the user when the combination of the classification result and the connected connection port is incorrect. As a notification method, a message may be displayed in terminal 50, an email made be transmitted to an email address registered in advance, an audio telephone call may be made to a telephone number registered in advance, or a notification may be made through another method or to another apparatus.

Device list holder 200 holds information pertaining to the devices connected to home network 11 in list format as the device list. The device list according to the present embodiment will be described with reference to FIG. 10 and FIG. 11. FIG. 10 is a diagram illustrating an example of the device list according to the present embodiment. FIG. 11 is a diagram illustrating another example of the device list according to the present embodiment.

As illustrated in FIG. 10, in addition to the information held by the device list according to Embodiment 1, the device list according to the present embodiment includes information about whether the device is connected to the IT device connection port or the appliance connection port of home gateway 20a.

Additionally, as illustrated in FIG. 11, a flag indicating whether or not communication is allowed may be included in the device list illustrated in FIG. 10 for when the combination of the device type and the connection port is incorrect. The flag may be obtained from the user in advance, for example.

2.3 Operations of Device Control Command Monitoring System

Operations of the device control command monitoring system include the following processing.

(1) Main Processing
(2) Classification Processing
(3) Determination Processing

The processing of (1) is the same as in Embodiment 1 and will therefore not be described here.

The processing of (2) and (3) will be described hereinafter with reference to the drawings.

2.3.1 Operations in Classification Processing

Figure 12:
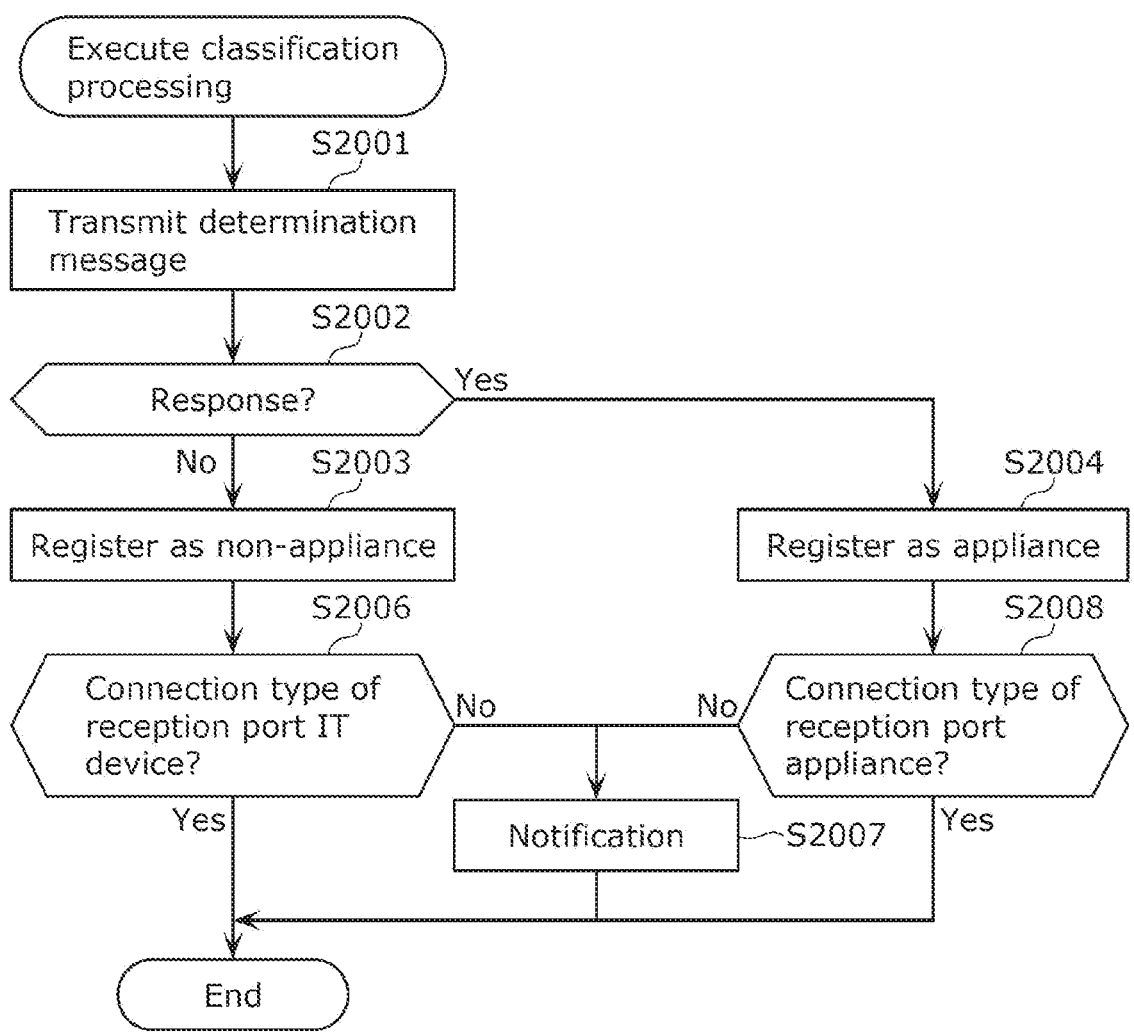
FIG. 12 is a flowchart illustrating an example of classification processing of a classifier according to Embodiment 2.

FIG. 12 is a flowchart illustrating an example of the classification processing of classifier 130 according to the present embodiment.

The processing of step S2001 to step S2004 illustrated in FIG. 12 is the same processing as that in Embodiment 1 and will therefore not be described here.

After registering the device to be classified in step S2003 (the transmission origin device of the received message) as a non-appliance, classifier 130 determines whether the reception port that received the communication message is the IT device connection port or the appliance connection port. For example, classifier 130 determines whether or not a connection type of the reception port that received the communication message is the IT device connection port (S2006).

Classifier 130 ends the classification processing if it is determined in step S2006 that the port is the IT device connection port (Yes in S2006).

However, if it is determined in step S2006 that the port is the appliance connection port (No in S2006), classifier 130 notifies the user that the combination of the device type and the connection port is incorrect (S2007).

After registering the device to be classified in step S2004 (the transmission origin device of the received message) as an appliance, classifier 130 determines whether the connection port that received the communication message (the reception port) is the IT device connection port or the appliance connection port. For example, classifier 130 determines whether or not a connection type of the reception port that received the communication message is the appliance connection port (S2008).

Classifier 130 ends the classification processing if it is determined in step S2008 that the port is the appliance connection port (Yes in S2008).

However, if it is determined in step S2008 that the port is the IT device connection port (No in S2008), classifier 130 notifies the user that the combination of the device type and the connection port is incorrect (S2007).

In this manner, in the classification steps (S2002 to S2007), when a device (e.g., the second device) is a device having a predetermined function (e.g., is an appliance) and that device is connected to the IT device connection port, or that device is not a device having the predetermined function (e.g., is not an appliance) and that device is connected to the appliance connection port, terminal 50 is notified to that effect.

Note that when the user is notified that the combination is incorrect in step S2007, classifier 130 may set the flag allowing communication in the device list in device list holder 200 upon receiving an instruction to allow communication from the user (see FIG. 11).

2.3.2 Operations in Determination Processing

Figure 13:
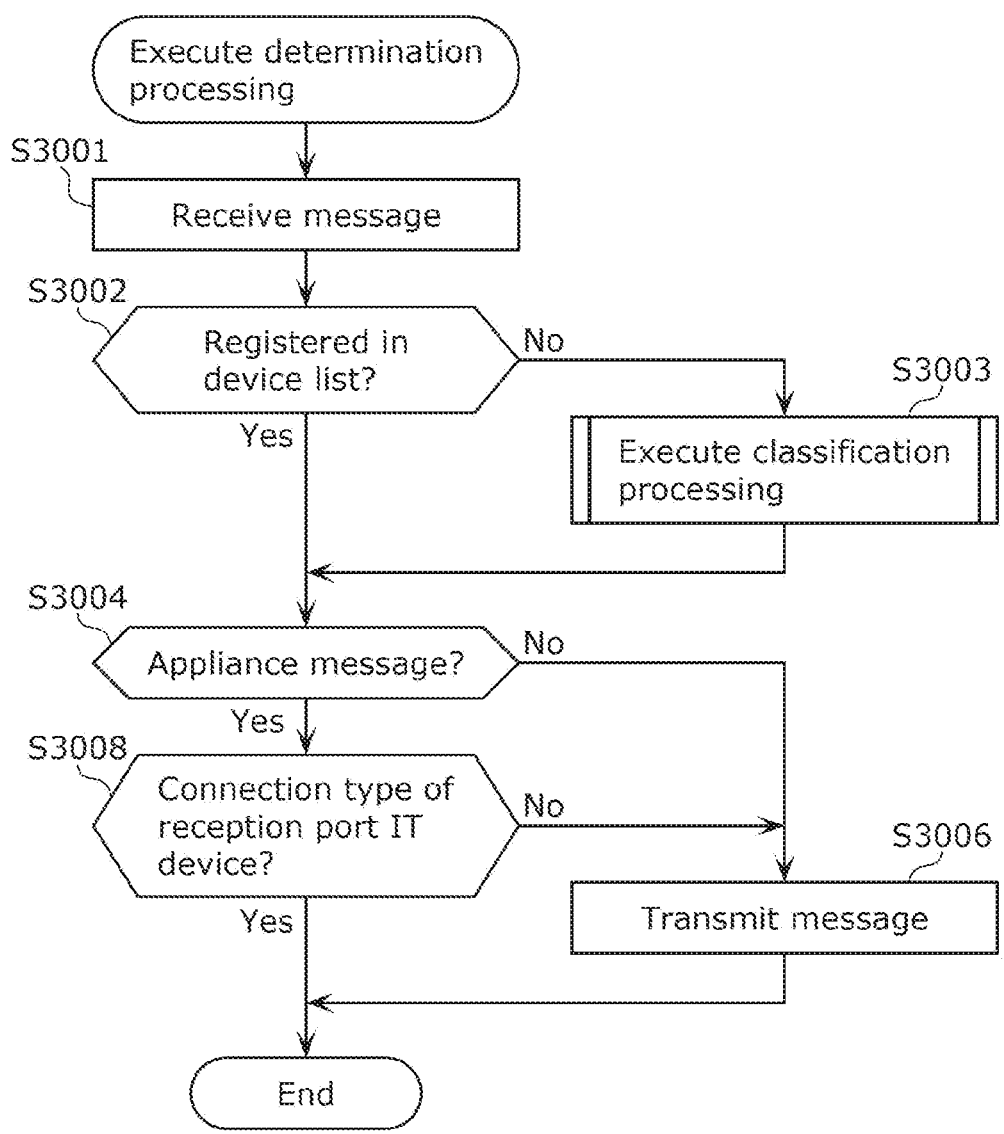
FIG. 13 is a flowchart illustrating an example of determination processing of the home gateway according to Embodiment 2.

FIG. 13 is a flowchart illustrating an example of the determination processing of home gateway 20a according to the present embodiment.

The processing of step S3001 to step S3004 and step S3006 illustrated in FIG. 13 is the same processing as that in Embodiment 1 and will therefore not be described here.

As illustrated in FIG. 13, when appliance message determiner 140 determines in step S3004 that the received message is an "appliance message" (Yes in S3004), forwarding determiner 150 determines whether the connection port that received the communication message (the reception port) is the IT device connection port or the appliance connection port. For example, when a determination of Yes is make in step S3004, forwarding determiner 150 further determines whether or not the connection type of the reception port is the IT device connection port (S3008). Forwarding determiner 150 makes the determination of step S3008 based on the connection type of the reception port to which the transmission origin device is connected. The connection type of the reception port being the appliance connection port, i.e., the connection type of the reception port not being an IT device connection, is an example of a third condition.

If it is determined in step S3008 that the reception port is the appliance connection port (No in S3008), forwarding determiner 150 requests transmitter 160 to transmit the message. Additionally, if it is determined in step S3008 that the reception port is the IT device connection port (Yes in S3008), forwarding determiner 150 ends the determination processing without transmitting the received message.

Note that a determination of No in step S3008, e.g., the second device being connected to the first connection port to which a device having the predetermined function is connected, is an example of a fourth condition. Then, forwarding determiner 150 may determine to transmit the received message (the appliance message) to the transmission destination device when the fourth condition is satisfied.

Figure 14:
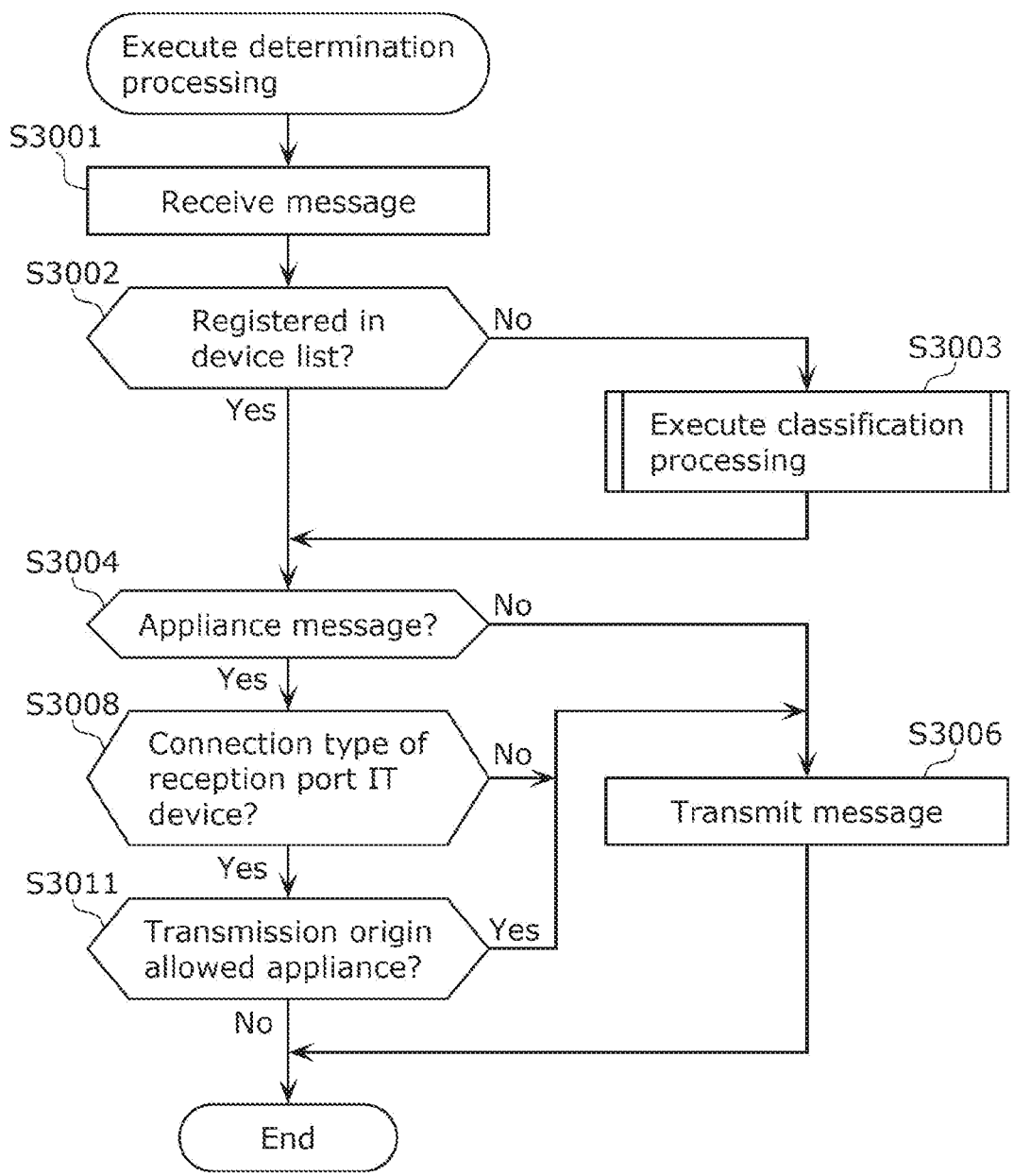
FIG. 14 is a flowchart illustrating another example of determination processing of the home gateway according to Embodiment 2.

Note that the processing of forwarding determiner 150 is not limited to the processing illustrated in FIG. 13. Another example of the processing of forwarding determiner 150 will be described with reference to FIG. 14. FIG. 14 is a flowchart illustrating another example of the determination processing of home gateway 20a according to the present embodiment. Note that the operations illustrated in FIG. 14 include executing step S3011 in addition to the operations illustrated in FIG. 13.

As illustrated in FIG. 14, rather than ending the processing, as illustrated in FIG. 13, after it is determined in step S3008 that the reception port is the IT device connection port (Yes in S3008), forwarding determiner 150 may further obtain information pertaining to the transmission origin of the received communication message from device list holder 200 and determine whether or not the transmission origin is an allowed device based on a communication allowance flag (see FIG. 11) indicating whether or not communication is allowed when the combination of the device type and the connection port is incorrect (S3011). At this time, forwarding determiner 150 requests transmitter 160 to transmit the message when it is determined in step S3011 that "Y" is set for the "communication allowance flag" and the transmission origin is an allowed appliance (Yes in S3011). On the other hand, forwarding determiner 150 ends the determination processing when it is determined in step S3011 that "N" is set for the "communication allowance flag" and the transmission origin is an appliance that is not allowed (No in S3011).

In this manner, when a determination of No is made in step S3011, i.e., when the third condition is not satisfied, forwarding determiner 150 may further determine whether or not the transmission origin device is a device permitted to communicate with the transmission destination device (S3011), and if the transmission origin device is a device permitted to communicate with the transmission destination device (Yes in S3011), may determine to transmit the communication message to the transmission destination device.

2.4 Effects of Embodiment 2

In the present embodiment, home network 11 is divided into IT device network 12 and appliance network 13 using home gateway 20a, and home gateway 20a is provided with two types of connection ports, i.e., a connection port for connecting a communication line of IT device network 12 and a connection port for connecting a communication line of appliance network 13.

Through this, home gateway 20a can detect that an appliance has been connected to IT device network 12 or that a non-appliance such as PC 30 has been connected to appliance network 13, and notify the user to that effect. By performing operations for connecting devices to the appropriate networks in response to the notification, the user can connect the devices to the appropriate networks. Additionally, when a device control command that improperly controls an appliance has been transmitted from a non-appliance device connected to IT device network 12, if the connection port that receives that received message is the IT device connection port, the device control command can be determined to be improper. Additionally, even if the location where a device is installed is a location better for connection to IT device network 12, that device can be allowed to transmit device control commands to appliances on appliance network 13 at the user's discretion even if the device is an appliance, which enables a flexible network configuration.

Embodiment 3

Embodiment 1 of the present disclosure described home gateway 20 as determining whether or not to forward device control commands based on the device type of the transmission origin device.

Here, Embodiment 3 of the present disclosure will describe a configuration in which whether or not to forward a device control command based on the operating state of each appliance, a state of a resident living in a home in which home gateway 20 is installed, and so on.

A device control command monitoring system according to the present embodiment will be described hereinafter.

3. System Configuration

The device control command monitoring system according to the present embodiment will be described here with reference to the drawings. Note that the same reference signs will be used for constituent elements having the same functions as in Embodiment 1 of the present disclosure or Embodiment 2 of the present disclosure, and detailed descriptions thereof will be omitted.

3.1 Overall Configuration of Device Control Command Monitoring System

The overall configuration of the device control command monitoring system according to the present embodiment is the same as in Embodiment 1 of the present disclosure and will therefore not be described.

Note that the overall configuration of the device control command monitoring system according to the present embodiment can also be applied to the overall configuration of Embodiment 2 of the present disclosure. Unless otherwise stated, the following descriptions will be based on the overall configuration of Embodiment 1 of the present disclosure.

3.2 Configuration of Home Gateway 20

Figure 15:
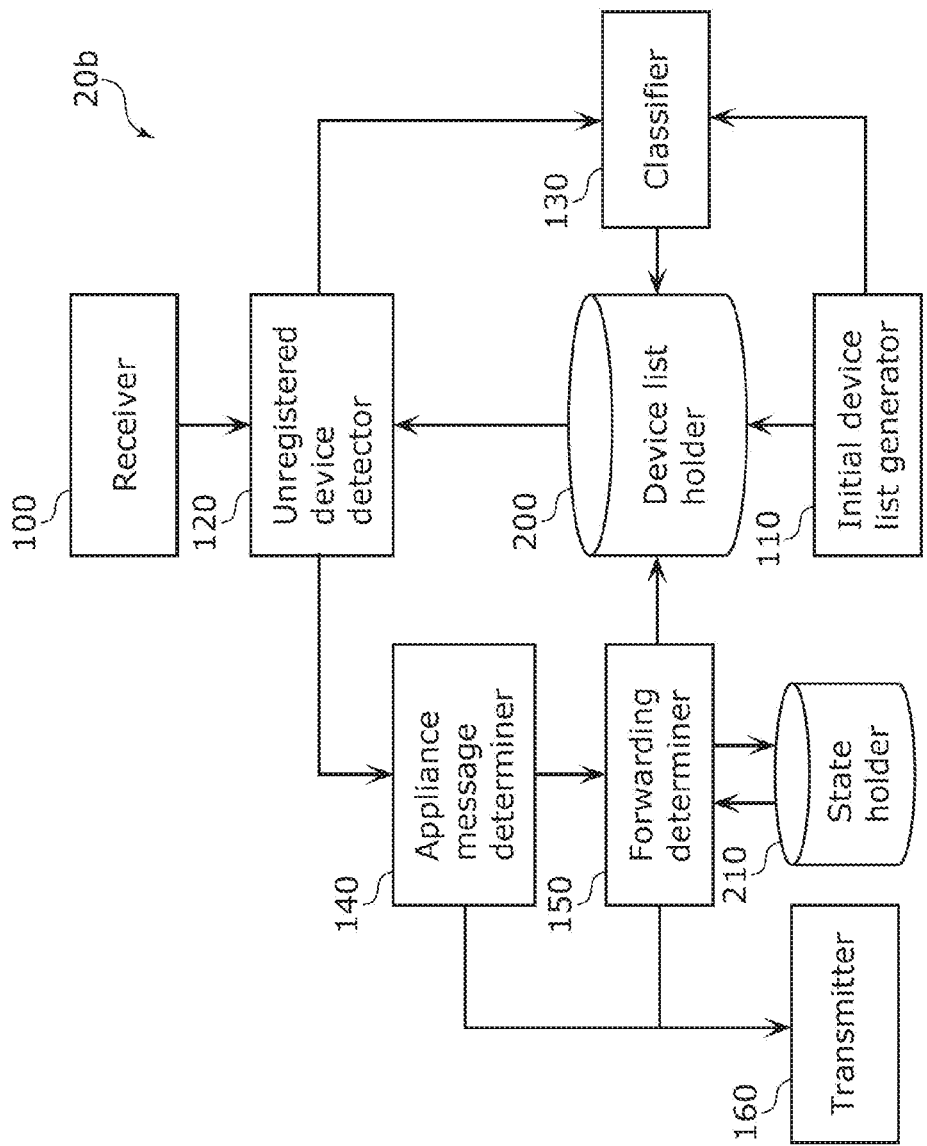
FIG. 15 is a block diagram of a home gateway according to Embodiment 3.

FIG. 15 is a block diagram of home gateway 20b according to the present embodiment. The same reference signs will be used for constituent elements having the same functions as in Embodiment 1, and detailed descriptions thereof will be omitted. Home gateway 20b includes receiver 100, initial device list generator 110, unregistered device detector 120, classifier 130, appliance message determiner 140, forwarding determiner 150, transmitter 160, device list holder 200, and state holder 210. In addition to home gateway 20 according to Embodiment 1, home gateway 20b includes state holder 210.

As illustrated in FIG. 15, when appliance message determiner 140 determines that a received communication message (a received message) is an appliance message, forwarding determiner 150 obtains information pertaining to the transmission origin device from the received message, and obtains a device No. from the device list held by device list holder 200. Forwarding determiner 150 obtains information pertaining to the state of the device that transmitted the communication message from the received message, and registers the information in the row of a state list held by state holder 210 (see FIG. 16, described later) where a state No. is "now". A state of the resident (user) living in the home is also estimated from sensor information included in the communication message, and the state is registered in the row of the state list where the state No. is "now".

Additionally, when home gateway 20 itself includes some kind of sensor (e.g., a motion sensor), the state of a resident living in the home is estimated from that sensor information and registered in the row of the state list where the state No. is "now". Note that the state of the resident may be, for example, information indicating the room in which the resident is present.

If the received message includes a device control command, forwarding determiner 150 checks whether or not a state following the execution of that device control command is included in the state list, and if the state is included in the state list, determines to forward the communication message.

State holder 210 holds information pertaining to the states of appliances connected to home network 11 in list format as the state list. FIG. 16 illustrates an example of the state list according to the present embodiment.

As illustrated in FIG. 16, the device No. of an appliance among the devices registered in the device list held by device list holder 200, and the state of a resident living in the home, are registered in the state list. Although FIG. 16 illustrates ON and OFF as examples of device states, the configuration is not limited thereto. For example, if the appliance is electric lock 40, the locked/unlocked state may be registered; and if the appliance is air conditioner 41, the set temperature, operating mode (cooling/heating or the like), and so on may be registered in addition to ON/OFF. Additionally, for example, if the device is lighting 42, a dimming state may be registered in addition to ON/OFF. Additionally, if, for example, the device is a motion sensor (not shown), a person being detected/a person not being detected may be registered, and if the device is a temperature/humidity sensor (not shown), the temperature and humidity values themselves may be registered. Additionally, as the state of the resident, in addition to being present or absent, information about where the resident is in the home, such as being only on the first floor, only on the second floor, only in a bedroom, only in the living room, only in the dining room or kitchen, and so on may be registered; attributes of people who are at home, such as only children or only grandparents being present, may be registered; and what the resident is doing, such as sleeping, may be registered. Although one state is registered for each device and resident in FIG. 16, a plurality of states may be registered, or separate columns may be registered for each state.

State No. "now" indicates the current state of the device and resident. The current state of the device may be the operating state of the transmission destination device after being controlled by the device control command, and the operating state of the transmission destination device before being controlled by the device control command. Each of state No. "1" to "3" indicates a state of the device and resident set in advance in order to determine whether or not the state of "now" is a state in which the received message is to be transmitted. The state indicated by state No. "now" matching any one of state No. "1" to "3" is an example of a second condition.

Note that it is acceptable for the state list to include at least one of the state of the device and the resident. For example, the state list may include at least the state of the device. In this case, the second condition included in the predetermined condition includes an operating state of the transmission destination device after being controlled by the device control command and an operating state of the transmission destination device before being controlled by the device control command being a pre-set operating state.

Note that the states indicated by state No. "1" to "3" may be operating states assumed to occur normally when the device is used, past use states of the device, or states set by the resident.

3.3 Operations of Device Control Command Monitoring System

Operations of the device control command monitoring system include the following processing.

(1) Main Processing
(2) Classification Processing
(3) Determination Processing

The processing of (1) and (2) is the same as in Embodiment 1 and will therefore not be described here.

The processing of (3) will be described hereinafter with reference to the drawings.

3.3.1 Operations in Determination Processing

Figure 17:
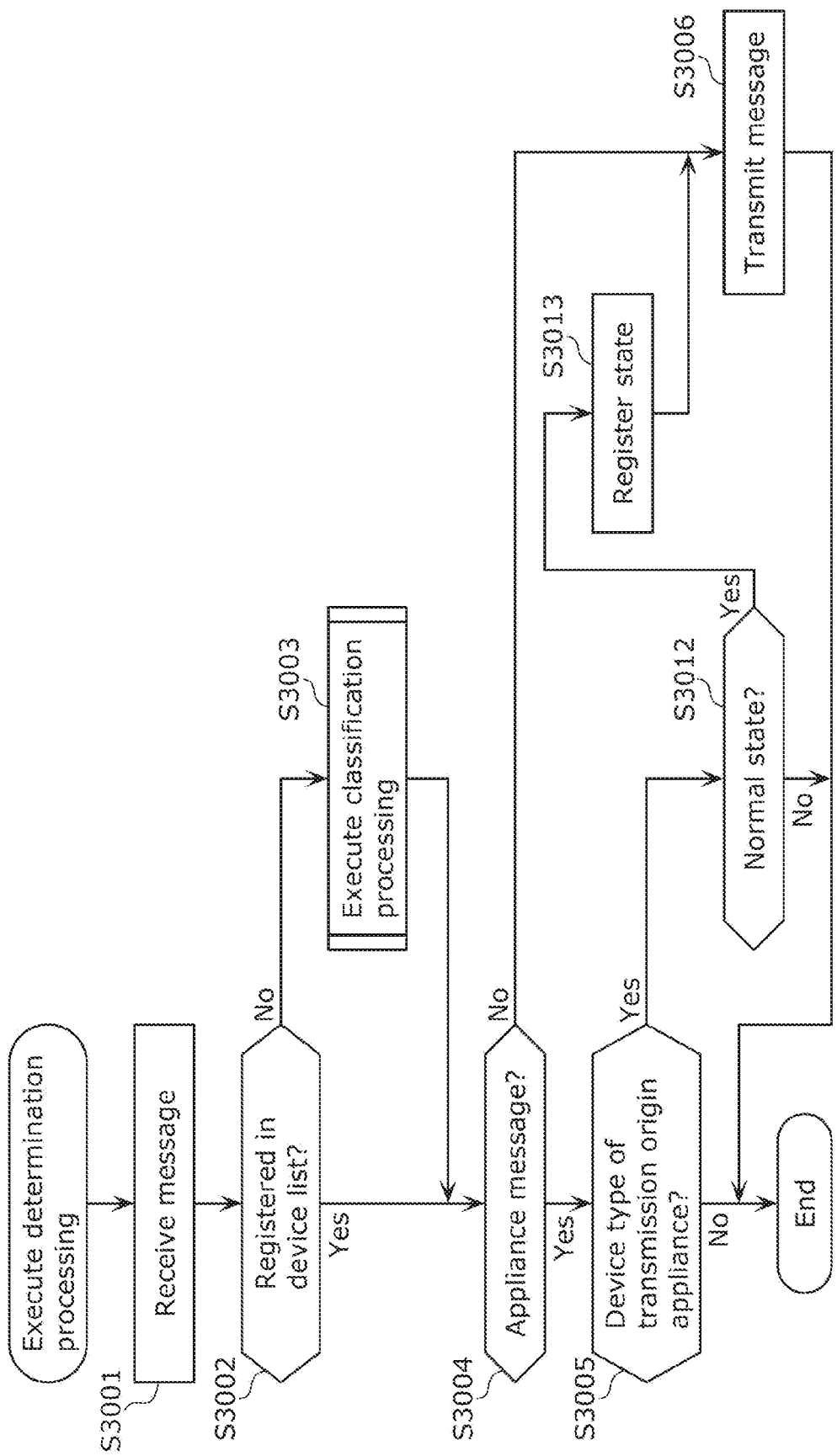
FIG. 17 is a flowchart illustrating an example of determination processing of the home gateway according to Embodiment 3.

FIG. 17 is a flowchart illustrating an example of the determination processing of home gateway 20 according to the present embodiment.

The processing of step S3001 to step S3006 illustrated in FIG. 17 is the same processing as that in Embodiment 1 and will therefore not be described here. Note that FIG. 17 illustrates a case where whether or not to transmit the received message is determined based on the state of the device and the resident after the device control command is executed.

As illustrated in FIG. 17, if the received message includes a device control command and it is determined in step S3005 that the transmission origin device is an "appliance" (Yes in S3004 and S3005), forwarding determiner 150 determines whether or not the state after that device control command is executed (the state of the device and the resident) is included in the state list (S3012). Forwarding determiner 150 determines that the state after executing the device control command is "normal" if the state is included in the state list and "anomalous" if the state is not included in the state list.

Note that the appliance message may include a message indicating a state change for the device (a state change message) instead of the device control command or in addition to the device control command. When, for example, the appliance message includes either of the device control command or the state change message, forwarding determiner 150 makes a determination of Yes in step S3004. Additionally, when, for example, at least the state change message is included in the appliance message, forwarding determiner 150 may make a determination of Yes in step S3012. In other words, the determination as to whether or not the state is normal in step S3012 may be made by determining whether or not a state change message has been received from a household appliance (whether or not the state of the household appliance has been changed to normal). Additionally, when the appliance message includes at least the state change message, forwarding determiner 150 may determine whether the state is normal/anomalous in step S3012 after applying information pertaining to the state to the information registered in the state list. Accordingly, when the state of the household appliance has been changed, forwarding determiner 150 can register the change in the state list based on the state change message.

Note that if the received message includes not only a device control command and a state change message but also information indicating the state of the device, forwarding determiner 150 may make a determination of Yes in step S3012. Additionally, forwarding determiner 150 may determine whether the state is normal/anomalous in step S3012 after applying information pertaining to the state to the information registered in the state list.

When a determination of "normal" is made in step S3012 (Yes in S3012), forwarding determiner 150 registers the state when it is necessary to update the information of the state list held by state holder 210 with the information included in the received message (S3013). It can also be said that when a determination of "normal" is made in step S3012, i.e., when the state of the device and the resident satisfies the second condition, forwarding determiner 150 further updates the state list indicating the operating state of the transmission destination device to the operating state of the transmission destination device after being controlled by the device control command. Step S3013 is an example of updating a registration state. Note that step S3013 is not a required process.

Forwarding determiner 150 then requests transmitter 160 to transmit the message. In other words, when the second condition is satisfied, forwarding determiner 150 determines that the received message is to be transmitted to the transmission destination device.

When a determination of "anomalous" is made in step S3012 (No in S3012), forwarding determiner 150 ends the determination processing. In other words, when the state of the device and the resident do not match the state list (when the state of the device and the resident are not present in the state list), the received message is not transmitted to the transmission destination device.

3.4 Effects of Embodiment 3

In the present embodiment, the state of at least one of each device and the resident is estimated from the appliance message received by home gateway 20, and the forwarding of the device control command is allowed only when that state is a correct state based on the state list. Accordingly, when an improper device control command is transmitted and a device is controlled by the improper control command such that a state which does not normally occur actually occurs, the device control command can be detected as being improper, which increases the possibility that an improper device control command can be detected even if information pertaining to the device, included in the message, has been forged by an attacker.

4. Other Variations

The present disclosure is of course not limited to the embodiments described above, and variations on the embodiments conceived by one skilled in the art and embodiments implemented by combining constituent elements from different other embodiments, for as long as they do not depart from the essential spirit thereof, fall within the scope of the present disclosure. For example, variations such as those described below are also included in the present disclosure.

4.1 Variation 1

Figure 18:
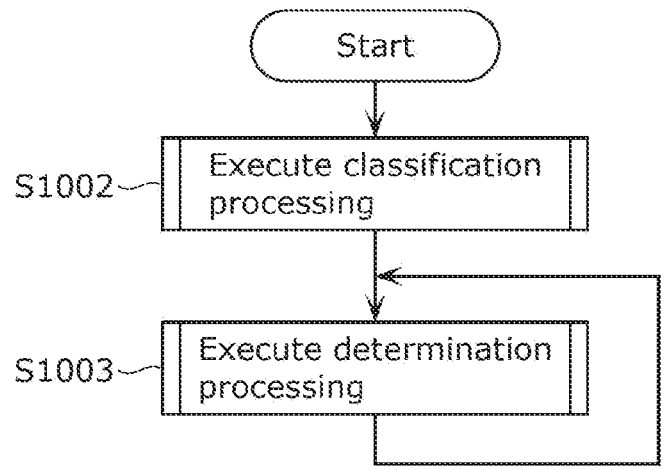
FIG. 18 is a flowchart illustrating an example of main processing of the home gateway according to Variation 1.

(1) Although the foregoing embodiments described all devices connected to home network 11 as being registered in the initial device list in the main processing, the configuration is not limited thereto. For example, as illustrated in FIG. 18, the home gateway may perform only the classification processing (S1002) and the determination processing (S1003) without performing the processing of generating the initial device list (S1001). FIG. 18 is a flowchart illustrating an example of the main processing of the home gateway according to the present variation.

Figure 19:
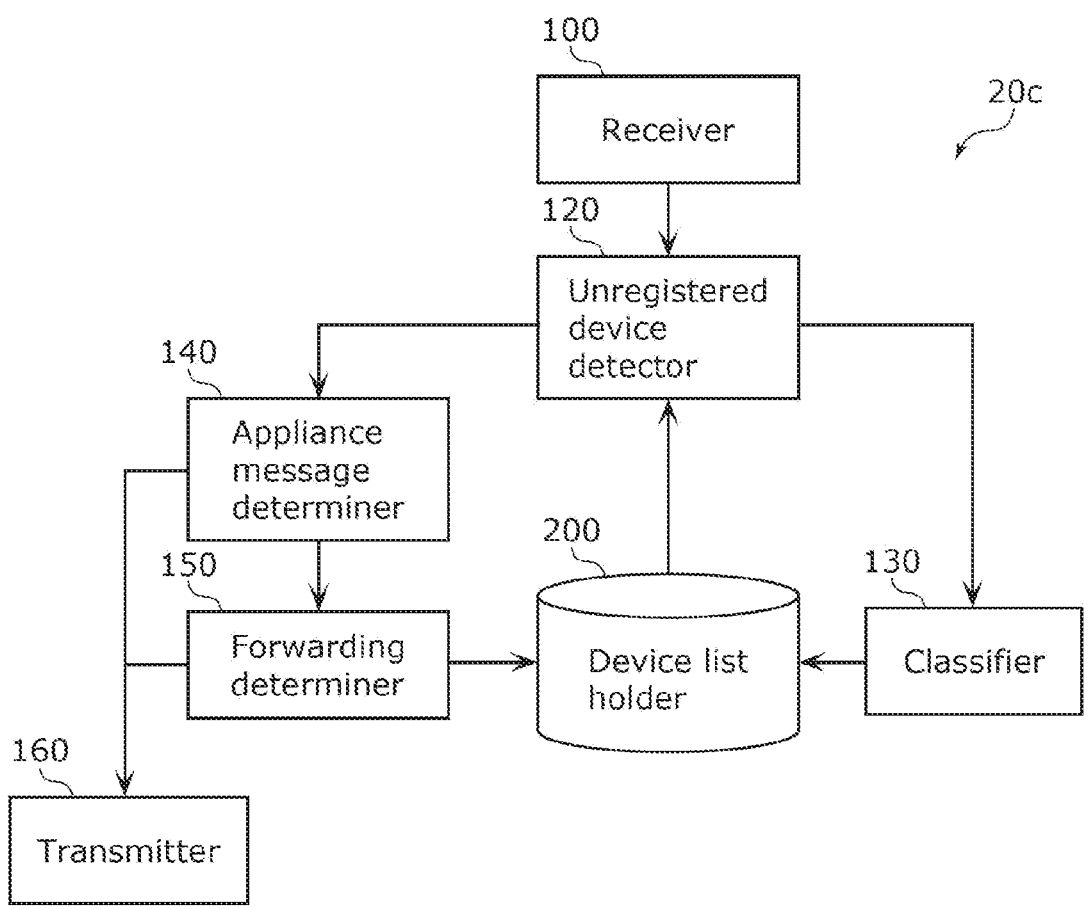
FIG. 19 is a block diagram of a home gateway according to Variation 1.

Additionally, an example of the configuration of such a home gateway is illustrated in FIG. 19. FIG. 19 is a block diagram of home gateway 20c according to the present variation.

As illustrated in FIG. 19, home gateway 20c according to the present variation has, for example, a configuration in which initial device list generator 110 has been removed from the configuration of home gateway 20 according to Embodiment 1 (see FIG. 2).

Note that even with the configuration illustrated in FIG. 19, the device list is generated, for example. For example, the device list may be generated and updated each time a received message is received.

Figure 20:
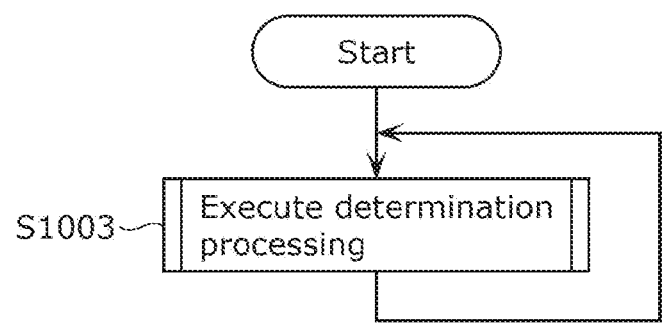
FIG. 20 is a flowchart illustrating another example of main processing of the home gateway according to Variation 1.

Additionally, for example, only the determination processing (S1003) may be performed, without performing the classification processing (S1002), as illustrated in FIG. 20. FIG. 20 is a flowchart illustrating another example of the main processing of home gateway 20c according to the present variation. The configuration of home gateway 20c in this case may be the configuration illustrated in FIG. 19. The same configuration changes and processing changes can be made in other embodiments and variations as well.

This makes it possible to reduce the processing time and bus load at the time of initial startup, which makes it possible to protect appliances connected to home network 11 immediately after home gateway 20c starts up.

4.2 Variation 2

Figure 21:
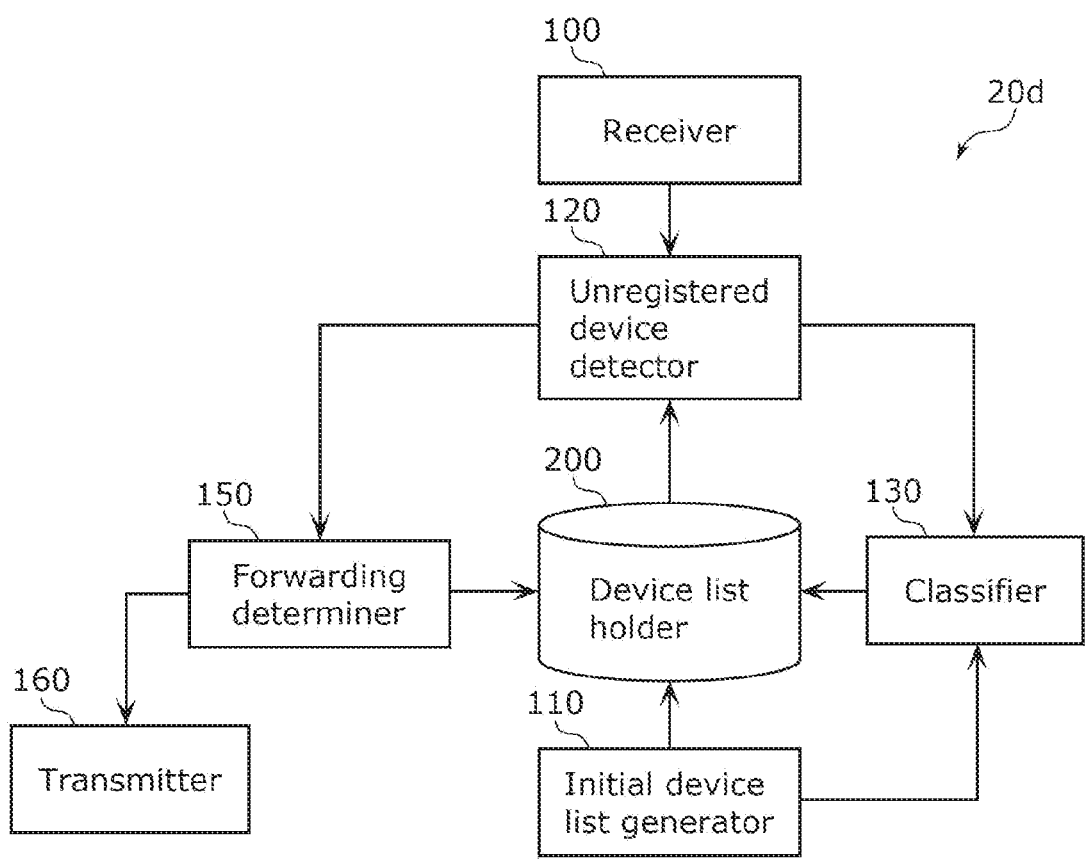
FIG. 21 is a block diagram of a home gateway according to Variation 2.

(2) Although the foregoing embodiments describe home gateway 20 as determining whether or not the received message is an appliance message and forwarding determiner 150 as making a determination only when the received message is an appliance message, the configuration is not limited thereto. Forwarding determiner 150 may make a determination for all instances of communication. The configuration of the home gateway in this case will be described with reference to FIG. 21. FIG. 21 is a block diagram of home gateway 20d according to the present variation.

As illustrated in FIG. 21, home gateway 20d according to the present variation has, for example, a configuration in which appliance message determiner 140 has been removed from the configuration of home gateway 20 according to Embodiment 1 (see FIG. 2). Operations of home gateway 20d will be described with reference to FIG. 22 to FIG. 25. FIG. 22 to FIG. 25 are flowcharts, each illustrating an example of determination processing of home gateway 20d according to the present variation.

Figure 22:
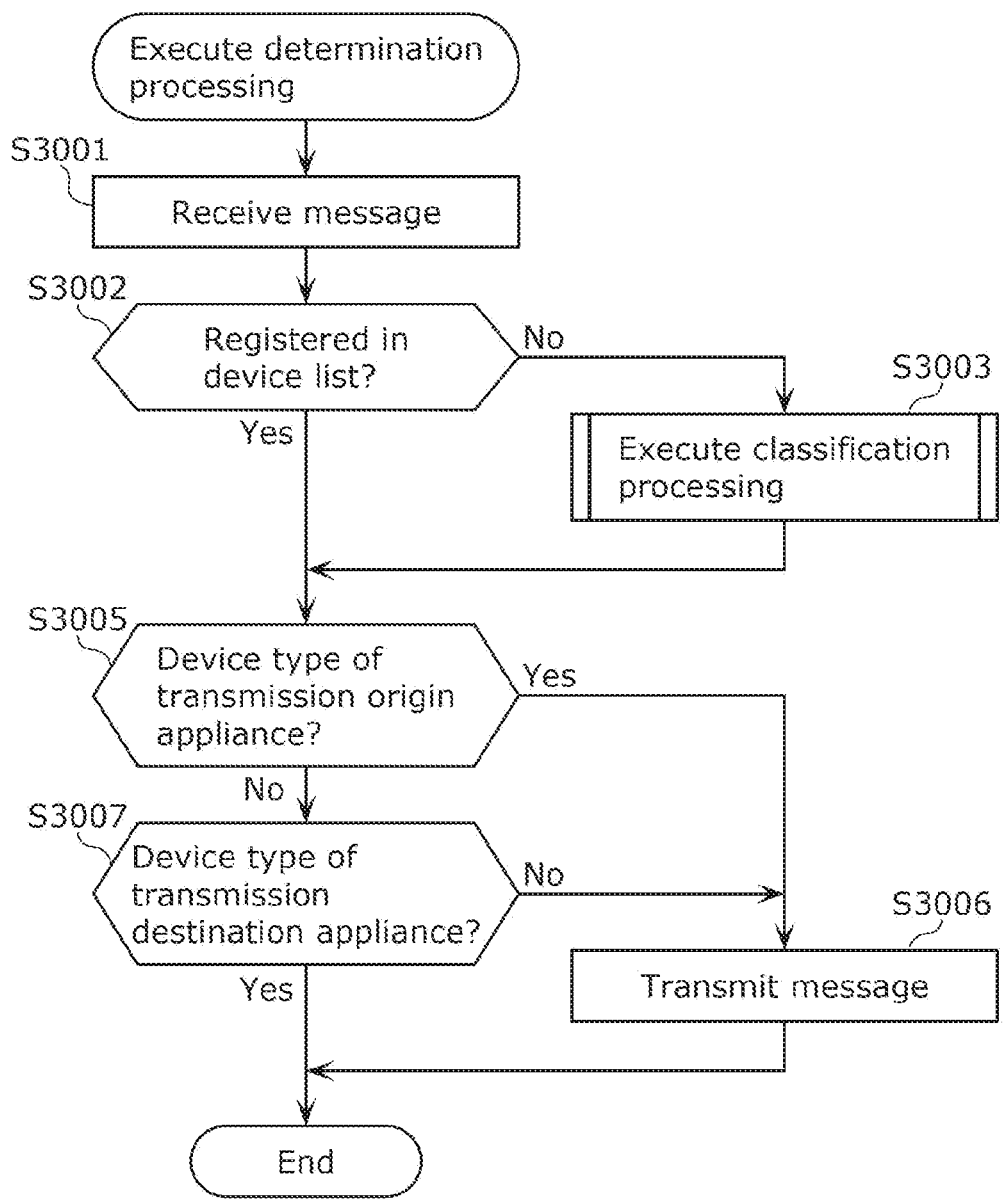
FIG. 22 is a flowchart illustrating a first example of determination processing of the home gateway according to Variation 2.
Figure 23:
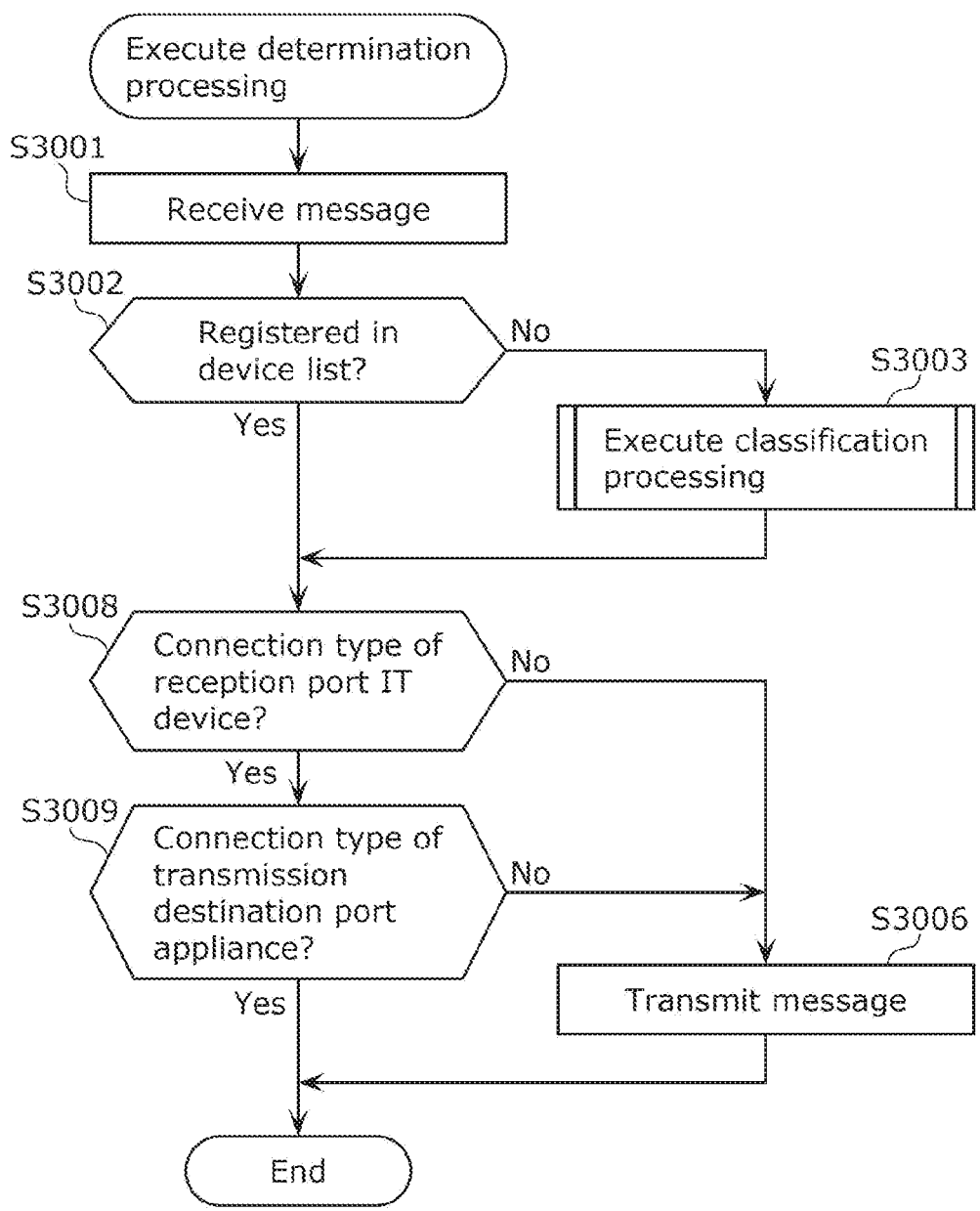
FIG. 23 is a flowchart illustrating a second example of determination processing of the home gateway according to Variation 2.

As illustrated in FIG. 22 to FIG. 25, the determination processing according to the present variation removes the step of determining whether or not the received message is an appliance message (S3004) from the determination processing of Embodiment 1 (FIG. 6). In FIG. 22, for example, forwarding determiner 150 determines whether or not to transmit the message based on information on the transmission origin and the transmission destination of the received message (S3005 and S3007) instead of step S3004. Additionally, in FIG. 23, for example, it is determined whether or not to transmit the communication message based on the connection port that received the communication message (the reception port) and the connection port to which the communication message is to be transmitted (a transmission destination port) (S3008 and S3009) instead of step S3004.

Figure 24:
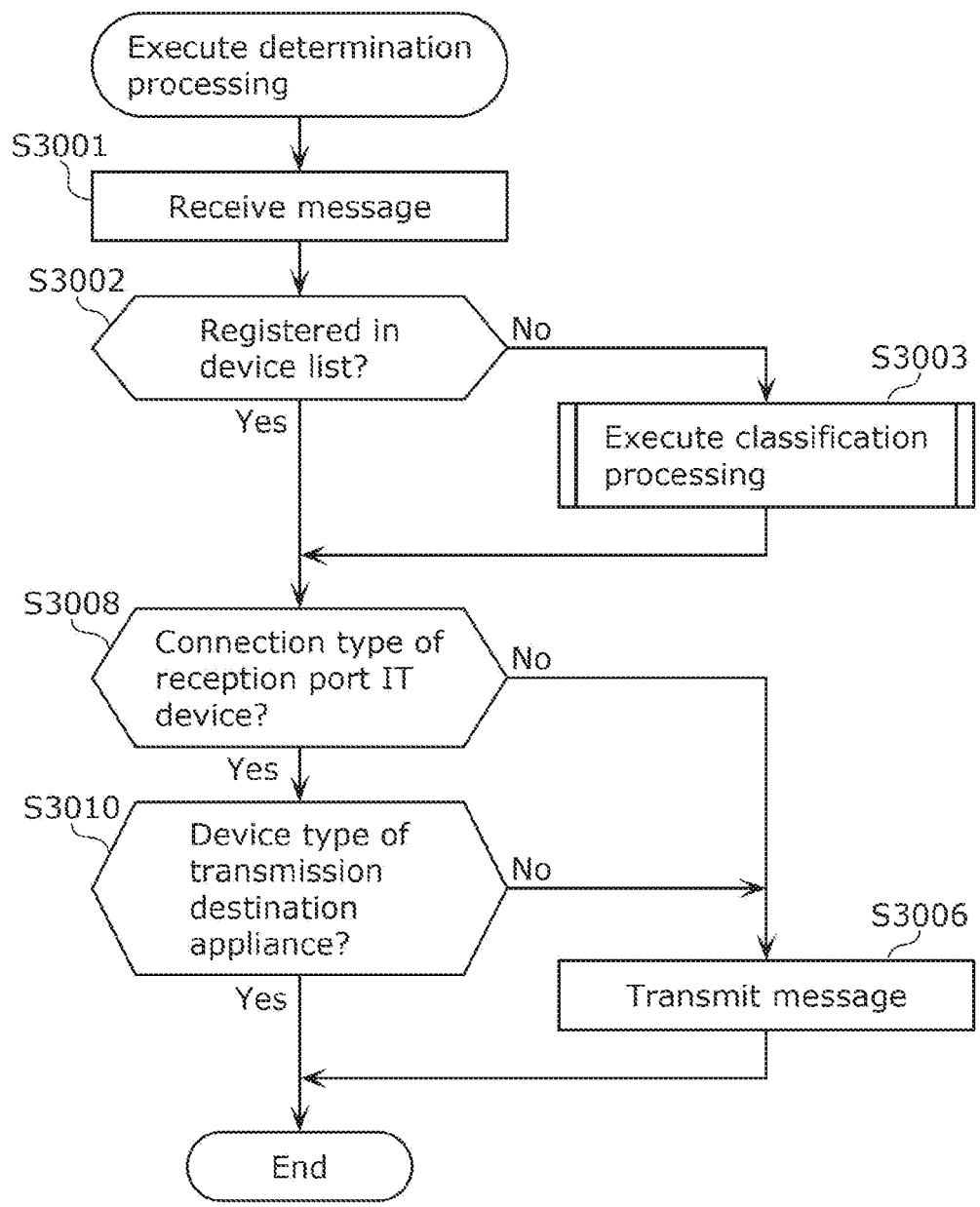
FIG. 24 is a flowchart illustrating a third example of determination processing of the home gateway according to Variation 2.
Figure 25:
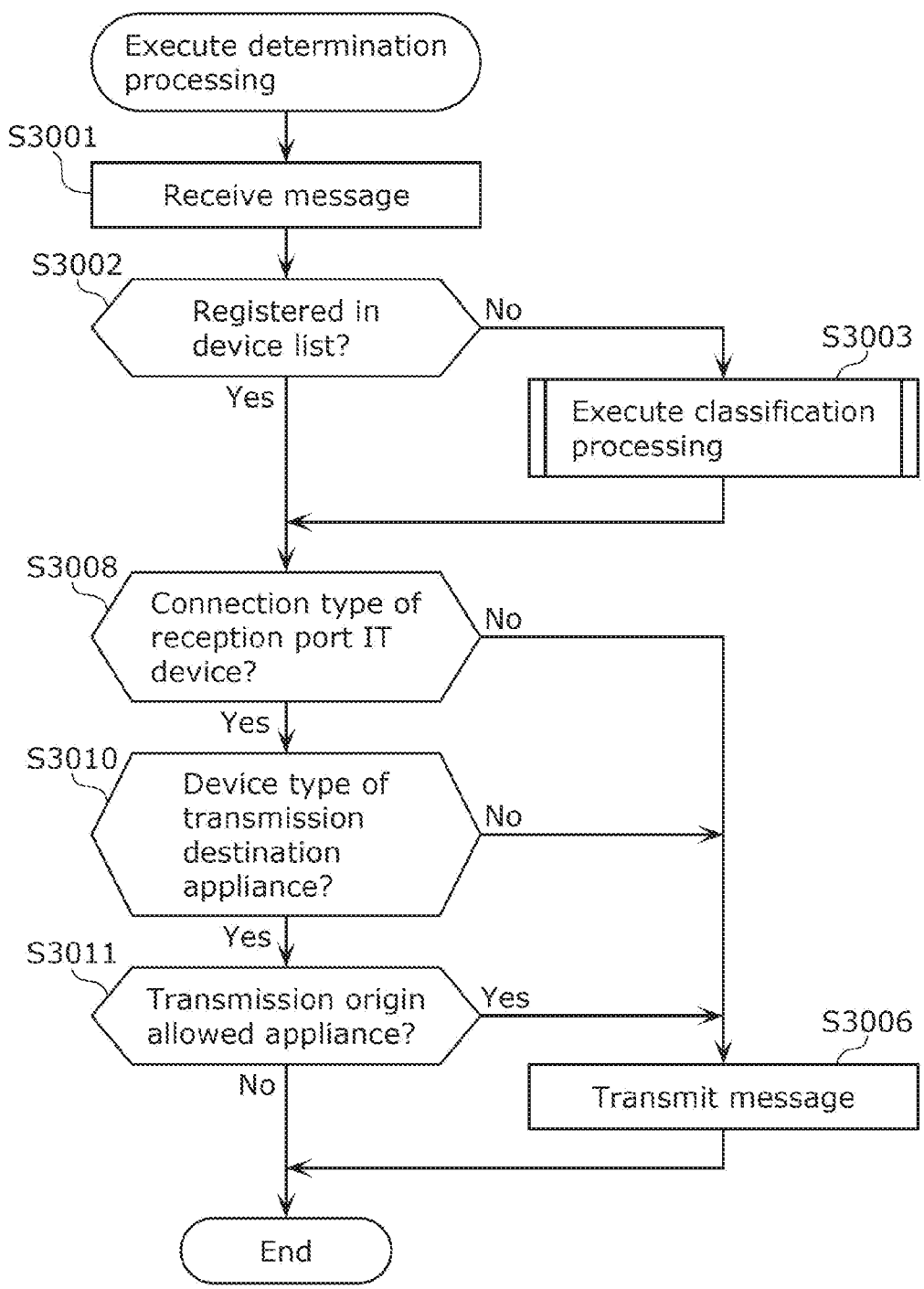
FIG. 25 is a flowchart illustrating a fourth example of determination processing of the home gateway according to Variation 2.

Additionally, in FIG. 24, for example, it is determined whether or not to transmit the communication message based on information on the reception port and the transmission destination (S3008 and S3010) instead of step S3004. Additionally, in FIG. 25, for example, it is determined whether or not to transmit the communication message based on the reception port, whether or not the transmission destination is an appliance, and whether or not the transmission origin device is allowed (S3008, S3010, and S3011) instead of step S3004. The same configuration changes and processing changes can be made in other embodiments and variations as well.

This makes it possible to prevent the transmission of an improper device control command even when it is difficult to determine from the received message whether or not that message is an appliance message. In addition, by limiting only messages from non-appliances to appliances, where the possibility of attacks is high, and not restricting other communication, attacks from non-appliances to appliances can be effectively prevented.

4.3 Variation 3

Figure 26:
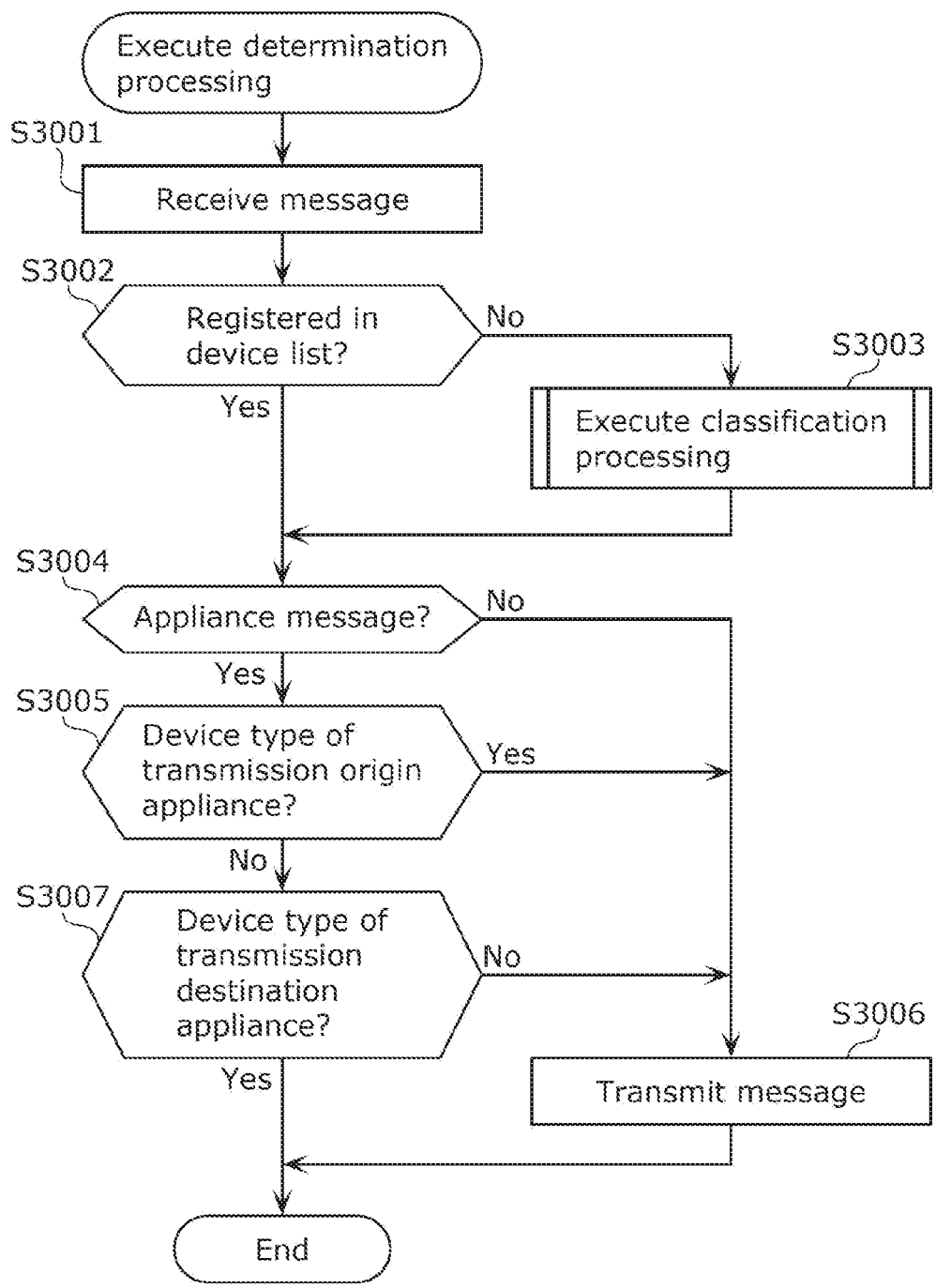
FIG. 26 is a flowchart illustrating an example of determination processing of the home gateway according to Variation 3.

(3) Although the foregoing embodiments described home gateway 20 as determining whether or not the received message is an appliance message and determining whether or not the device type of the transmission origin device is an appliance, the configuration is not limited thereto. As illustrated in FIG. 26, forwarding determiner 150 of home gateway 20 further determines whether or not the device type of the transmission destination device is "appliance" (S3007), and does not transmit the communication message when the device type is "appliance" (Yes in S3007) but transmits the communication message when the device type is "non-appliance" (No in S3007). It can be said that in the determining as to whether or not to transmit the received message to the transmission destination device based on a predetermined condition, when the first condition is not satisfied (No in S3005), forwarding determiner 150 further determines whether or not the transmission destination device is a device having the predetermined function (e.g., is an appliance), and when the transmission destination device is not a device having the predetermined function (No in S3007), determines that the communication message is to be transmitted to the transmission destination device. FIG. 26 is a flowchart illustrating an example of determination processing of home gateway 20 according to the present variation.

This makes it possible for an appliance message transmitted from a non-appliance to a non-appliance to be excluded from the determination by forwarding determiner 150, which in turn makes it possible to reduce adverse environmental effects. In other words, situations where an appliance message transmitted from a non-appliance to a non-appliance is blocked needlessly can be suppressed.

4.4 Variation 4

Figure 27:
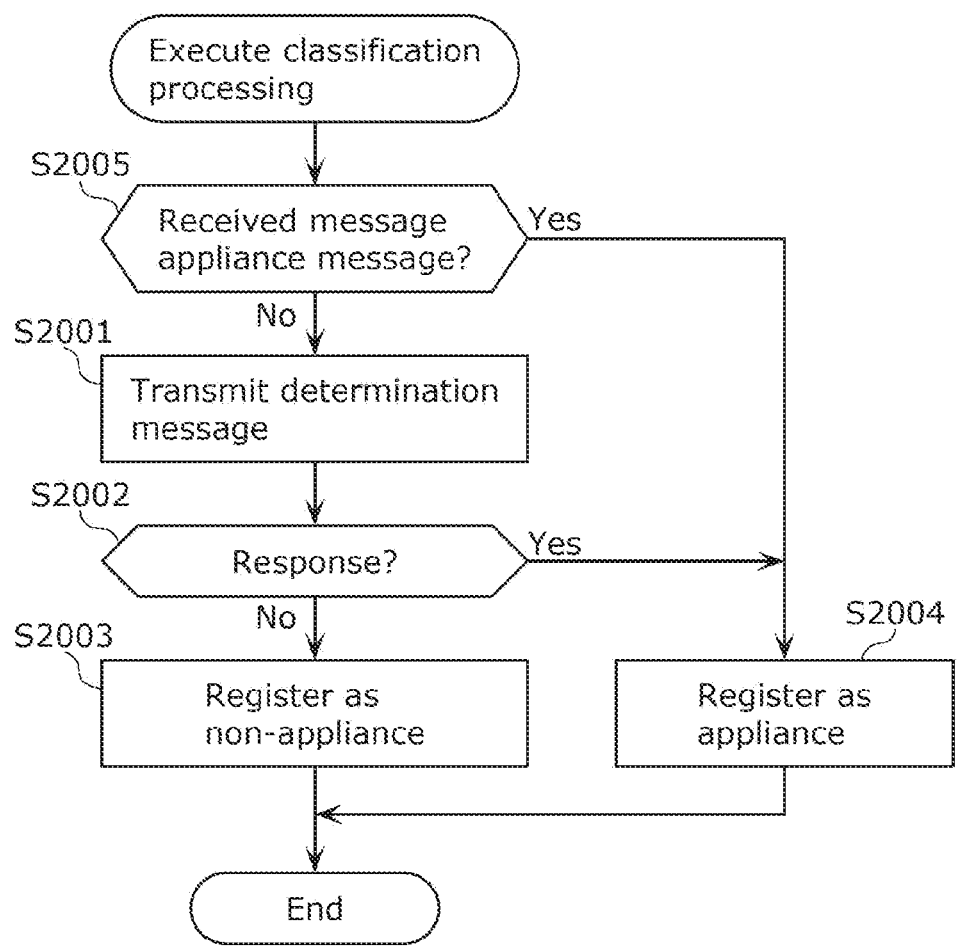
FIG. 27 is a flowchart illustrating an example of classification processing of a classifier according to Variation 4.

(4) Although the foregoing embodiments describe classifying devices by transmitting the determination message in the classification processing, the configuration is not limited thereto. For example, as illustrated in FIG. 27, classifier 130 may determine whether or not the received message is an appliance message (S2005) and register the transmission origin device as an appliance (S2004) when the message is an appliance message. FIG. 27 is a flowchart illustrating an example of the classification processing of classifier 130 according to the present variation.

4.5 Variation 5

Figure 28:
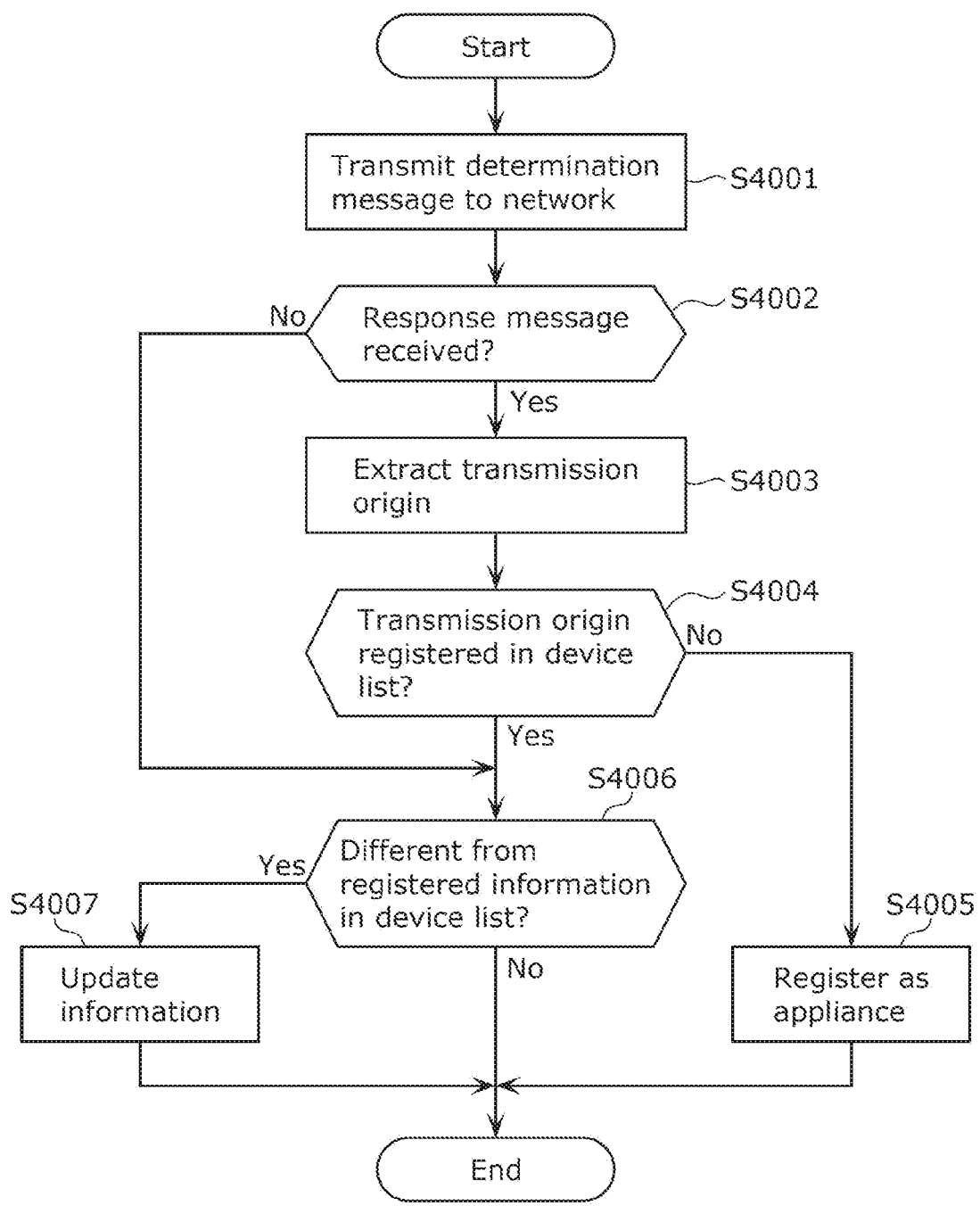
FIG. 28 is a flowchart illustrating an example of classification update processing of a classifier according to Variation 5.

(5) Although the foregoing embodiments described performing the classification processing during the initial startup of home gateway 20 or when the transmission origin of the received communication message is not registered in the device list, the configuration is not limited thereto. Home gateway 20 may further perform classification update processing for updating the classifications (updating the device list). FIG. 28 is a flowchart illustrating an example of the classification update processing of classifier 130 according to the present variation. The classification update processing is an example of updating the device list.

As illustrated in FIG. 28, in the classification update processing, first, classifier 130 transmits the determination message to the network (S4001). Classifier 130 transmits, to each of the plurality of devices, a message (a determination message) for determining whether or not communication is possible with the plurality of devices connected to home network 11 using a protocol for controlling appliances. Step S4001 is an example of transmitting the determination message to each of the plurality of devices.

Next, classifier 130 determines whether or not a response message has been received in response to the determination message (S4002). When a response message is received in step S4002 (Yes in S4002), classifier 130 extracts the transmission origin from the response message (S4003) and determines whether or not the extracted transmission origin is registered in the device list (S4004). The transmission origin not being registered in the device list in step S4004 (No in S4004) means that a new device has been connected, and thus classifier 130 registers (adds) that device to the device list. At this time, classifier 130 registers "appliance" as the device type (S4005). Note that a determination of Yes in step S4002 is an example of receiving the response message in response to each of the determination messages.

Next, if a response message has not been received before a set amount of time has passed in step S4002 (No in S4002), or if the transmission origin is not registered in the device list in step S4004 (Yes in S4004), classifier 130 determines whether or not there is a difference from the registration information in the device list (S4006). It can also be said that classifier 130 determines whether or not a determination result indicating whether or not a device has the predetermined function based on the response message matches registration information of the device in the device list. Step S4006 is an example of such a determination as to whether or not the determination result matches the registration information.

Next, if there is a difference from the registration information in the device list in step S4006 (Yes in S4006), classifier 130 updates the information of the device list for that device (S4007). When a determination of Yes is made in step S4006, classifier 130 updates the registration state of that device in the device list based on the determination result in step S4006. Step S4007 is an example of updating a registration state of the device in the device list.

Additionally, if the registration information in the device list is the same in step S4006 (No in S4006), classifier 130 ends the classification update processing.

This makes it possible to handle even cases where a device is added or deleted. Note that the classification update processing illustrated in FIG. 28 may be executed periodically, or may be executed based on an instruction from the user.

4.6 Variation 6

(6) Although the foregoing Embodiment 2 described notifying the user when the combination of the device type and the connection port is incorrect, the configuration is not limited thereto. After notifying the user, the device for which the combination of the device type and the connection port is incorrect (an improper device) may be subjected to exclusion processing for disabling communication, or the exclusion processing may be performed immediately without notifying the user.

4.7 Variation 7

Figure 29:
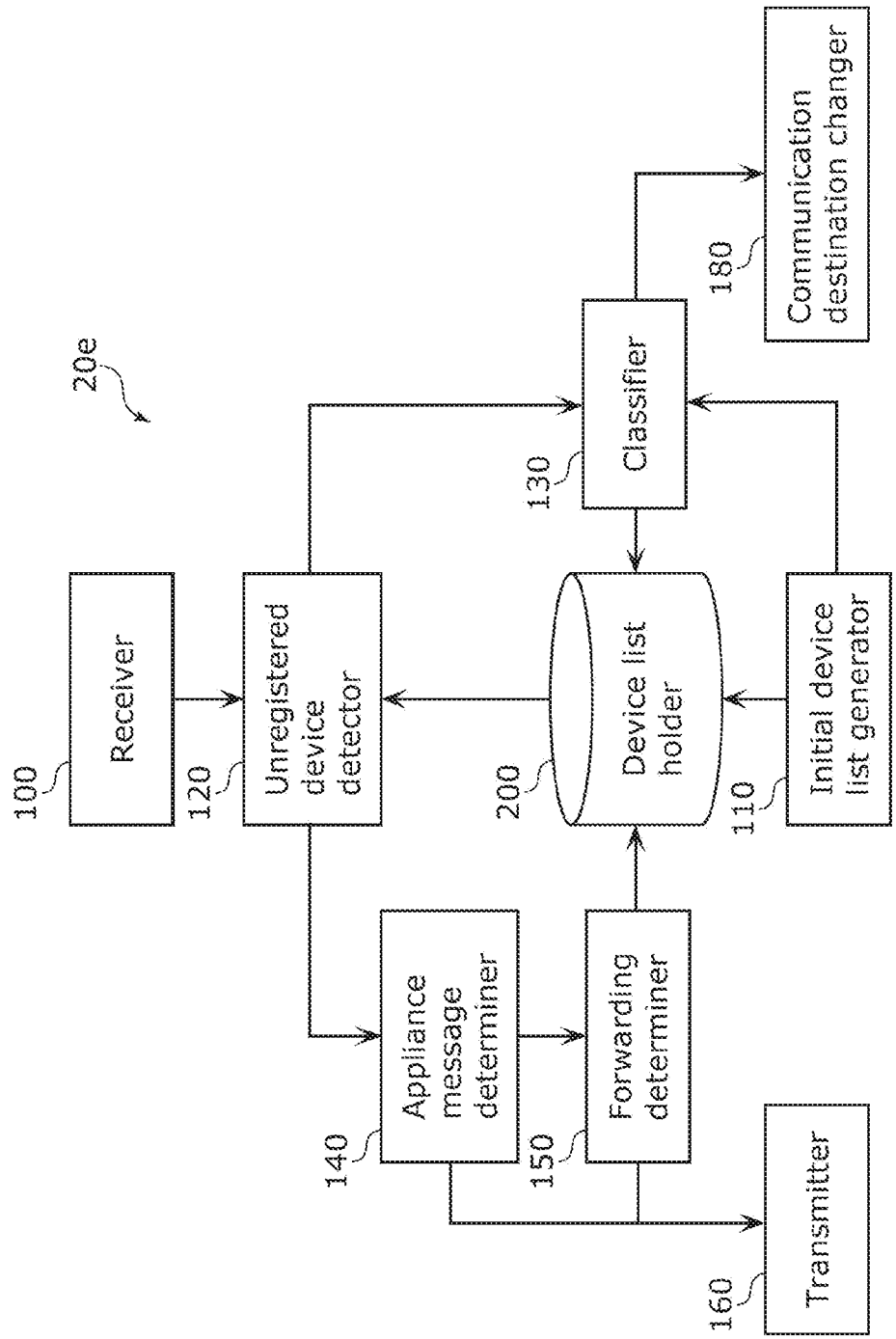
FIG. 29 is a block diagram of a home gateway according to Variation 7.

(7) Although the foregoing Embodiment 2 described notifying the user when the combination of the device type and the connection port is incorrect and forwarding the communication message when the user permits communication, the configuration is not limited thereto. FIG. 29 is a block diagram of home gateway 20e according to the present variation.

Figure 30:
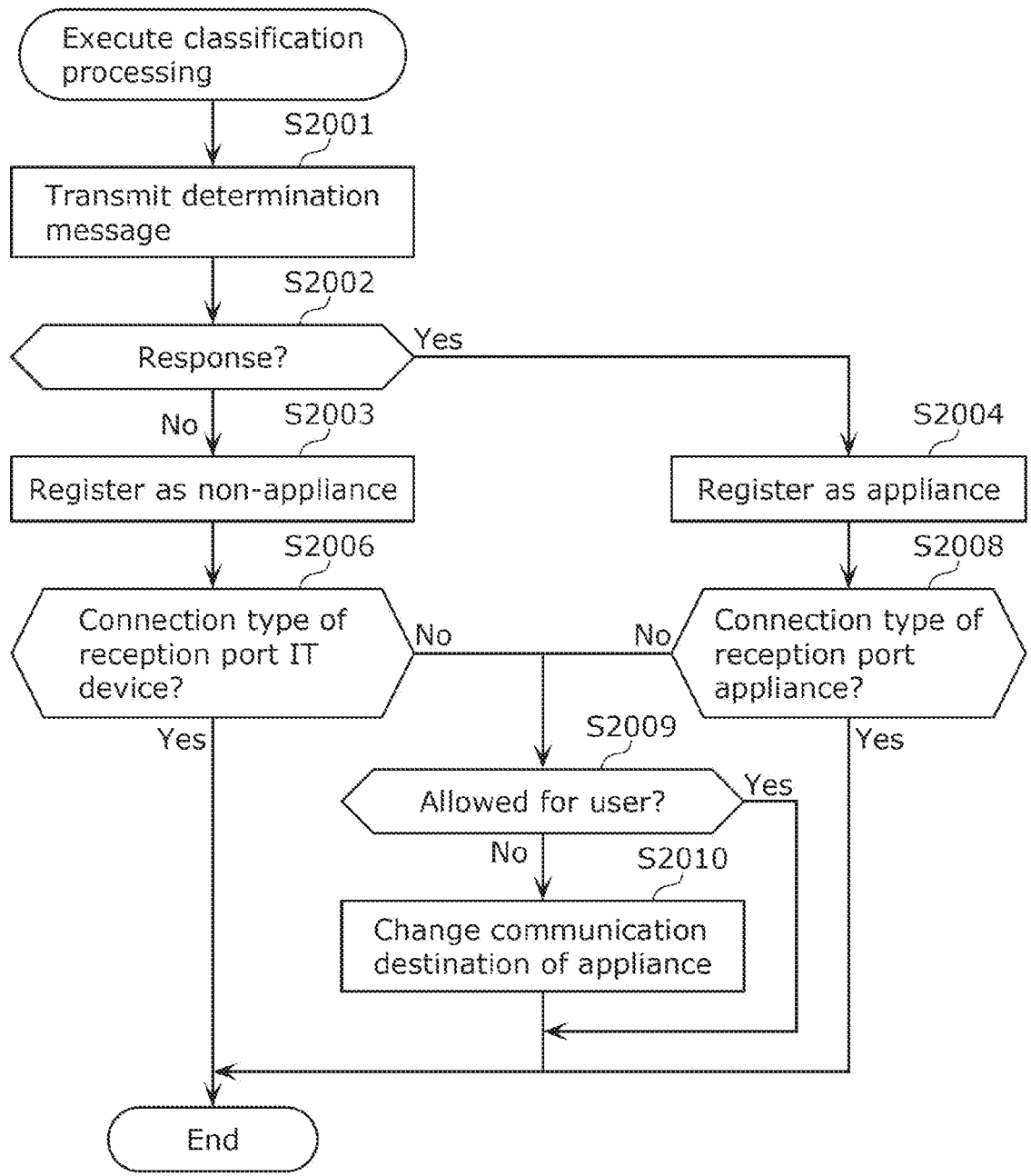
FIG. 30 is a flowchart illustrating an example of classification processing of a classifier according to Variation 7.

As illustrated in FIG. 29, home gateway 20e according to the present variation includes communication destination changer 180 in addition to home gateway 20 according to Embodiment 1. Communication destination changer 180 changes a communication destination of a communication message from one device to another device. For example, communication destination changer 180 changes the communication destination when allowed by the user. It can also be said that communication destination changer 180 changes a communication path of a communication message from one device to another device. FIG. 30 is a flowchart illustrating an example of the classification processing of classifier 130 according to the present variation. Note that S2001 to S2004, S2006, and S2008 indicated in FIG. 30 are the same as in FIG. 12, and will therefore not be described.

As illustrated in FIG. 30, if a non-appliance device is connected to the appliance connection port during the classification processing performed by classifier 130 (No in S2002 and S2006), or if an appliance is connected to the IT device connection port (Yes in S2002 and No in S2008), classifier 130 further determines whether or not the device has been allowed by the user (S2009). Classifier 130 may make the determination of step S2009 by accepting, from the user, whether or not to allow communication between the transmission origin device and the transmission destination device, or may make the determination of step S2009 based on a list of devices allowed to communicate.

Next, if allowed by the user (Yes in S2009), communication destination changer 180 does not change the communication destination. If not allowed by the user (No in S2009), communication destination changer 180 may change the communication destination of the appliance (S2010), change the communication destination of communication of each device with appliances, or change the communication destination of non-appliance devices. The method of changing the communication destination is, for example, using ARP messages as described in PTL 1, but is not limited thereto as long as the communication destination is changed.

In this manner, when the transmission origin device is connected to the appliance connection port and is a device not having a non-appliance function, and the transmission destination device is connected to the appliance connection port and is an appliance, in the classifying, when the transmission origin device and the transmission destination device are not allowed to communicate, the communication message is transmitted from the transmission origin device to the transmission destination device via home gateway 20e to which the transmission destination device is connected. Home gateway 20e can execute the determining as to whether or not to transmit the received message to the transmission destination device through forwarding determiner 150.

Assume, for example, a case where an overall block diagram of the device control command monitoring system is based on the block diagram illustrated in FIG. 8, with PC 30 being connected to hub 70. It can be said that this is a case where a non-appliance device is connected to the appliance connection port. At this time, for example, when PC 30 transmits a communication message to an appliance (e.g., air conditioner 41), the communication message is transmitted and received via hub 70. In other words, when PC 30 transmits the communication message to an appliance, the communication is performed without going through home gateway 20e. This means that no determination processing is performed by forwarding determiner 150. Accordingly, as described above, if the user has not allowed communication from PC 30 (an example of a non-appliance device) to the appliance (No in S2009), the communication destination of the communication message is changed so that the communication message from PC 30 is transmitted to the appliance via home gateway 20e. The same process is performed when controller 43 connected to hub 70 is a terminal such as a smartphone.

This makes it possible for forwarding determiner 150 to determine whether or not to forward communication from devices which are not allowed, which in turn makes it possible to enhance security.

4.8 Variation 8

Figure 31:
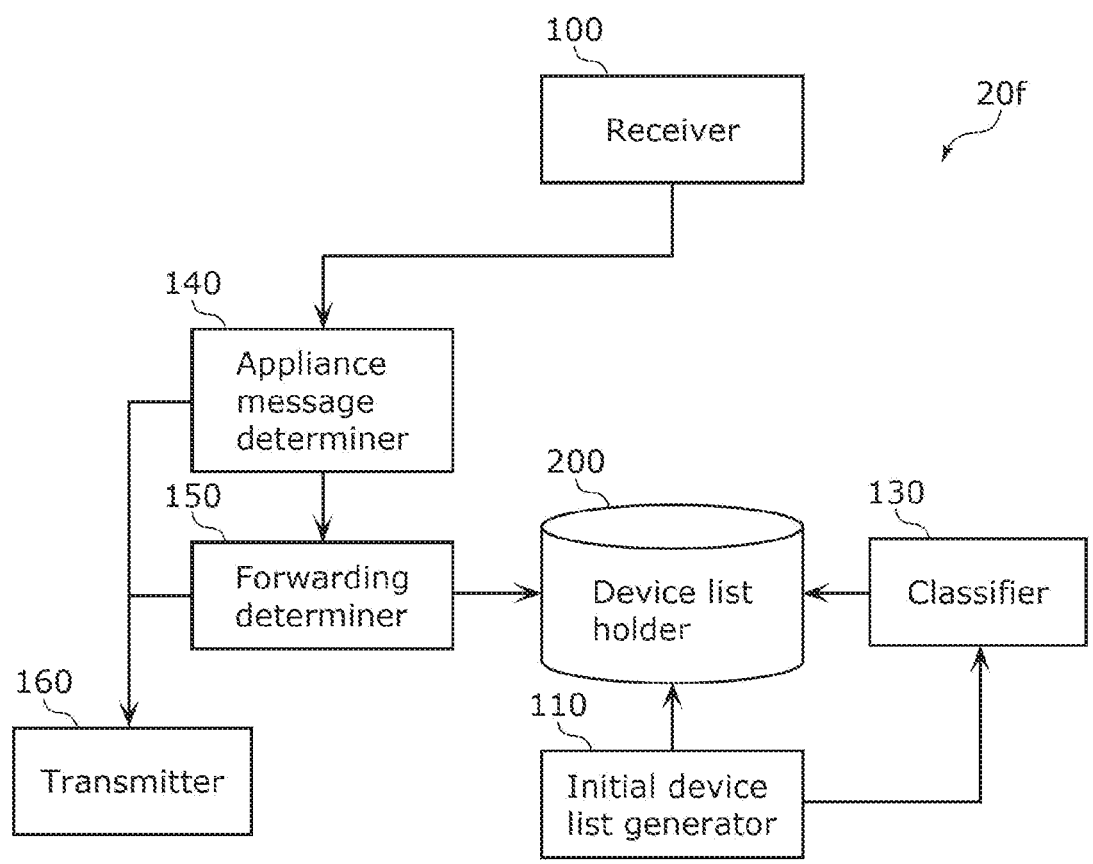
FIG. 31 is a block diagram of a home gateway according to Variation 8.

(8) Although the foregoing embodiments described unregistered device detector 120 as determining whether or not the transmission origin of the received communication message is registered in the device list, and additionally registering the transmission origin when the transmission origin is not registered, but the configuration is not limited thereto. FIG. 31 is a block diagram of home gateway 20f according to the present variation.

Figure 32:
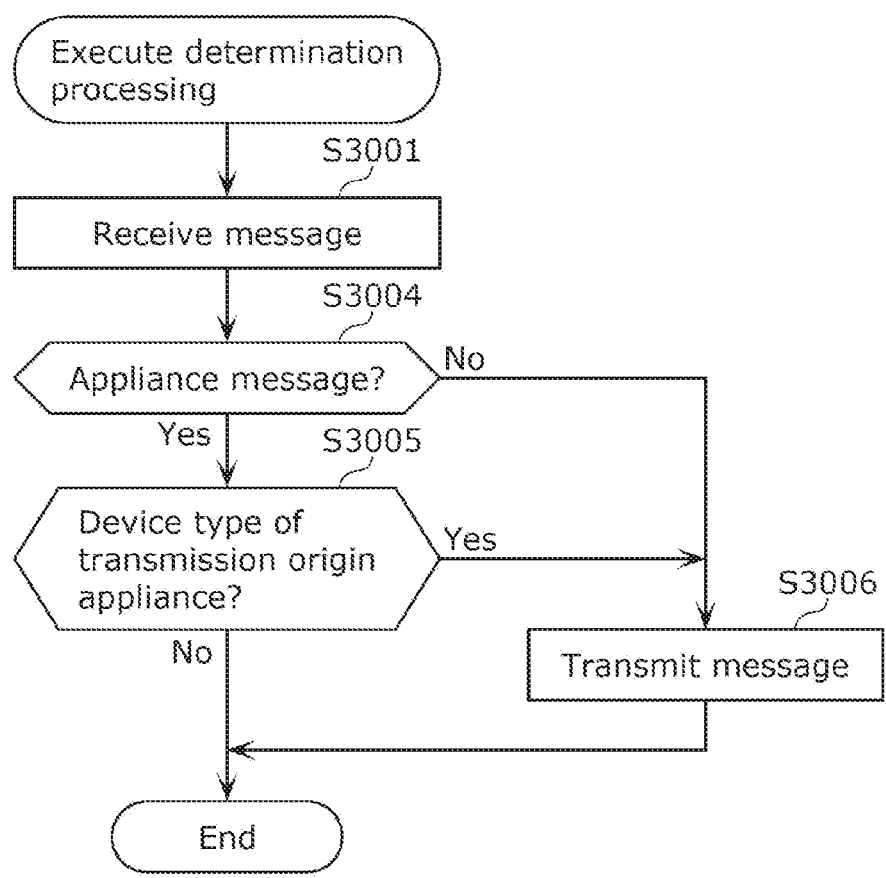
FIG. 32 is a flowchart illustrating an example of determination processing of a home gateway according to a variation.

As illustrated in FIG. 31, compared to home gateway 20 according to Embodiment 1, home gateway 20f is configured without unregistered device detector 120. FIG. 32 is a flowchart illustrating an example of determination processing of home gateway 20f according to the present variation.

As illustrated in FIG. 32, the processing of steps S3002 and S3003 can be omitted from the flowchart illustrated in FIG. 6. Even with such a configuration, home gateway 20f can prevent communication when a new and improper appliance is added to home network 11.

4.9 Variation 9

(9) Although the foregoing embodiments described notifying the user when the combination of the device type and the connection port is incorrect, a notification to the user may be displayed on a screen of terminal 50 and an input may be accepted from the user. At this time, the user may input whether to allow or disallow communication an appliance for which the combination of the device type and the connection port is incorrect, input whether to exclude or allow communication for a computer connected to the appliance connection port, or input whether or not to also allow communication to an appliance when communication is allowed for a computers connected to the appliance connection port (e.g., PC 30). If communication with the computer connected to the appliance connection port is not allowed, the communication destination may be changed and checked by forwarding determiner 150.

FIG. 33 to FIG. 38 are diagrams illustrating examples of a screen display according to the present variation.

Figure 33:
FIG. 33 is a diagram illustrating an example of a screen display according to a variation.

FIG. 33 illustrates an example of a screen display when, for example, a determination of No is made in step S2008 of FIG. 12. This screen display includes, for example, display 500, indicating that the type (device type) is "appliance controller" and the device is connected to the IT device connection port, and display 501 (an icon) for accepting an input from the user.

Figure 34:
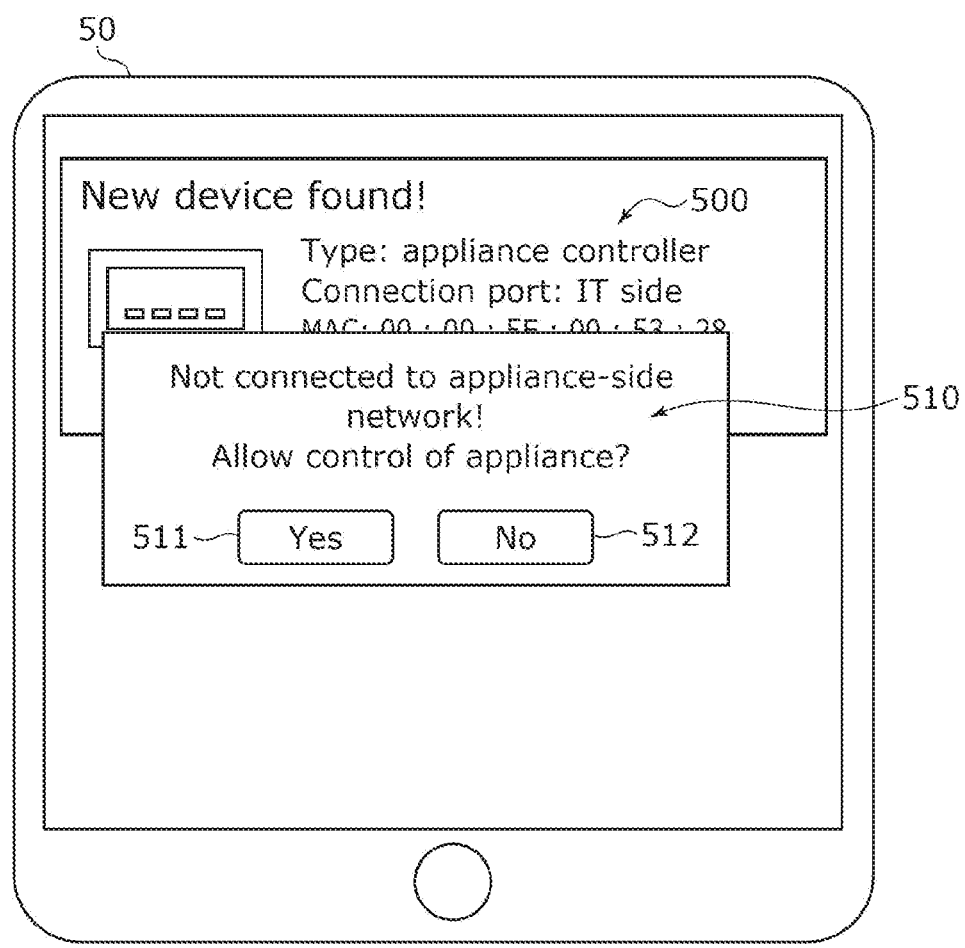
FIG. 34 is a diagram illustrating an example of a screen display according to a variation.

FIG. 34 illustrates an example of the screen display when, for example, a determination of No is made in step S2008 of FIG. 12 and the device is not connected to an appliance-side network. This screen display includes, for example, the foregoing display 500, as well as display 510 for accepting an input from the user as to whether or not to allow an appliance to be controlled by the appliance controller, display 510 including display 511 for allowing the appliance controller to control the appliance and display 512 for not allowing the stated control.

Figure 35:
FIG. 35 is a diagram illustrating an example of a screen display according to a variation.

FIG. 35 illustrates an example of the screen display when, for example, a determination of No is made in step S2008 of FIG. 12. This screen display includes, for example, display 502, indicating that the type (device type) is "lighting" and the device is connected to the IT device connection port, and display 503 (an icon) for accepting an input from the user.

Figure 36:
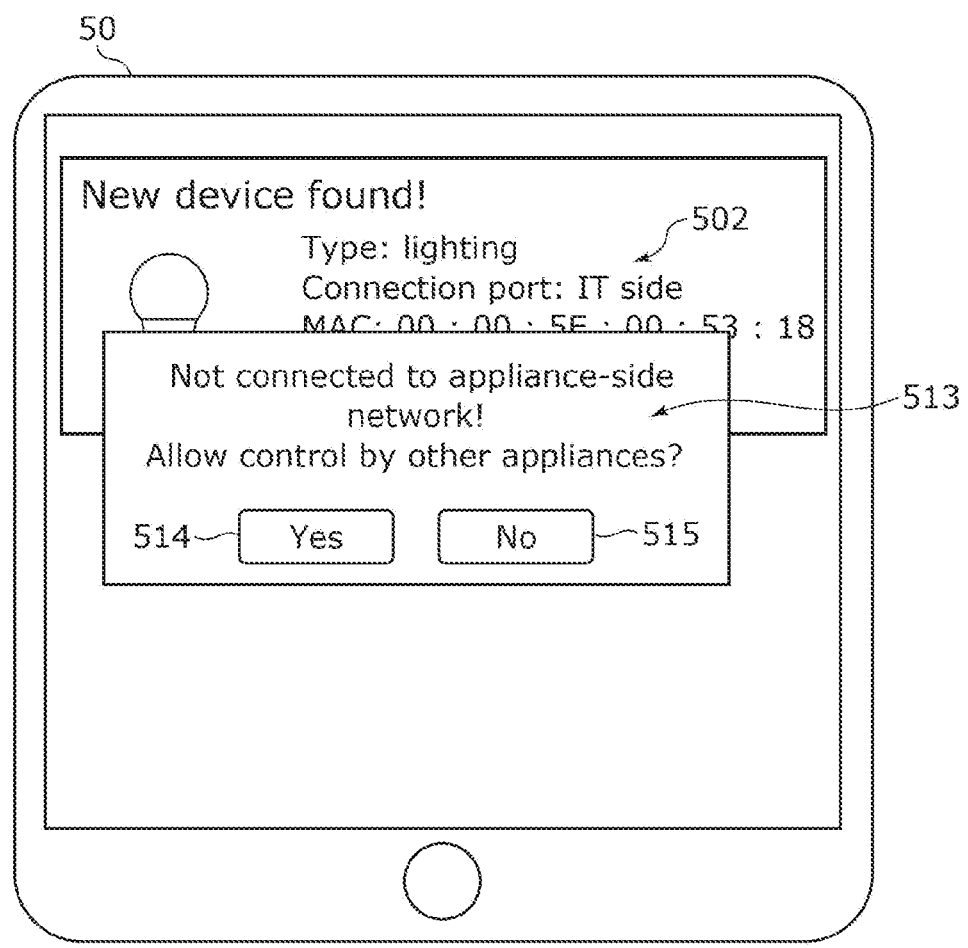
FIG. 36 is a diagram illustrating an example of a screen display according to a variation.

FIG. 36 illustrates an example of the screen display when, for example, a determination of No is made in step S2008 of FIG. 12 and the device is not connected to an appliance-side network. This screen display includes, for example, the foregoing display 502, as well as display 513 for accepting an input from the user as to whether or not to allow the lighting to be controlled by another device, display 513 including display 514 for allowing the lighting to be controlled by another device and display 515 for not allowing the stated control.

Figure 37:
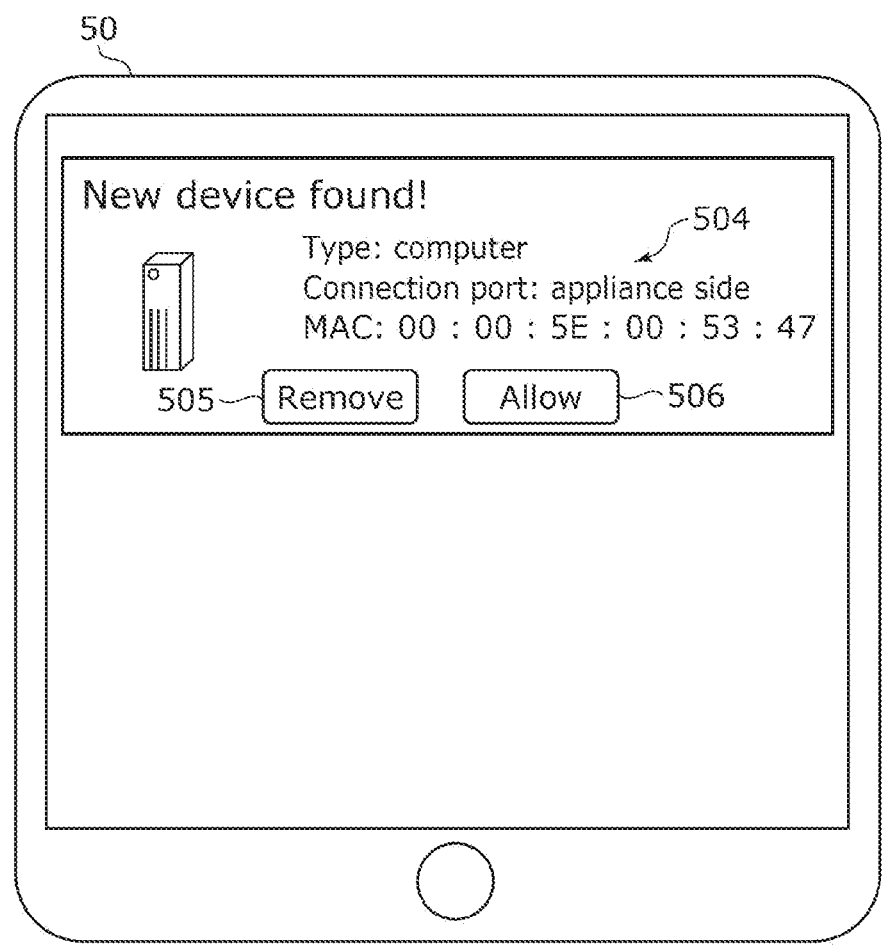
FIG. 37 is a diagram illustrating an example of a screen display according to a variation.

FIG. 37 illustrates an example of the screen display when, for example, a determination of No is made in step S2006 of FIG. 12. This screen display includes, for example, display 504, indicating that the type (device type) is "computer" and the device is connected to the appliance connection port, as well as display 505 for excluding the computer and display 506 for allowing communication.

Figure 38:
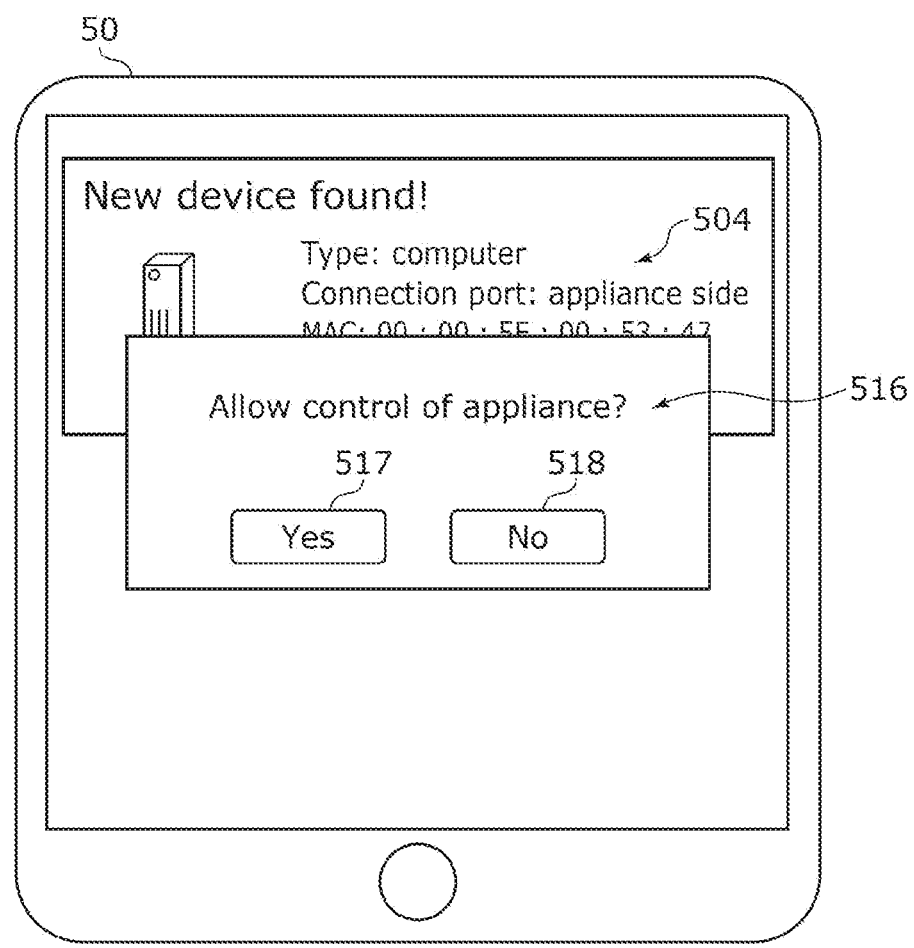
FIG. 38 is a diagram illustrating an example of a screen display according to a variation.

FIG. 38 illustrates an example of the screen display when, for example, a determination of No is made in step S2006 of FIG. 12 and the device is not connected to an IT-side network. This screen display includes, for example, the foregoing display 504, as well as display 516 for accepting an input from the user as to whether or not to allow an appliance to be controlled by the computer, display 516 including display 517 for allowing the computer to control the appliance and display 518 for not allowing the stated control.

Figure 39:
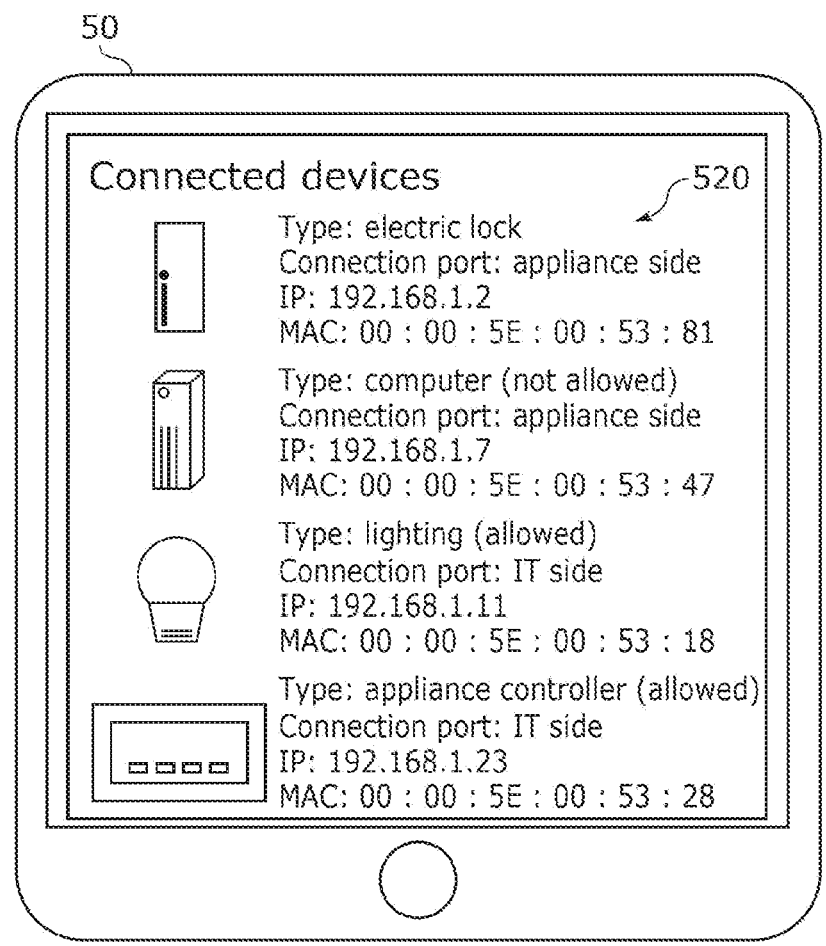
FIG. 39 is a diagram illustrating an example of a screen display according to a variation.

Additionally, as illustrated in FIG. 39, terminal 50 may have a function for displaying list 520 of devices connected to home gateway 20, and which device the user has allowed communication with may be displayed.

4.10 Other Variations

(10) Although the foregoing embodiments described registering "appliance" and "non-appliance" as device types, the configuration is not limited thereto. When a plurality of communication protocols for controlling appliances are present within home network 11, the device type may be registered as, for example, a device of protocol 1, a device of protocol 2, or another device. Then, forwarding determiner 150 may determine to transmit (forward) when the device type of the transmission origin device and the device type of the transmission destination device are the same, and not transmit when the device type of the transmission origin device and the device type of the transmission destination device are different.

(11) Although the foregoing embodiments described configurations in which appliances, a PC, and the like are connected to home network 11, the configuration is not limited thereto. The configuration may be such that a control device or a PC is connected to a factory network, or a building facility device, a management apparatus, or a PC is connected to a building network, or various types of electronic control units are connected to an in-vehicle network. Any configuration can be employed as long as a plurality of devices are connected to a network that is restricted to a certain space, and communication is performed to control those devices.

(12) Although the foregoing embodiments simply mentioned home network 11, IT device network 12, or appliance network 13, these may be connected by Ethernet (registered trademark), CAN, or another type of wired communication, or by Bluetooth (registered trademark), Wi-Fi (registered trademark), ZigBEE, Z-Wave (registered trademark), or another type of wireless communication, and are independent of the communication method.

(13) Each device in the foregoing embodiments is specifically a computer system constituted by a microprocessor, ROM (Read Only Memory), RAM (Random Access Memory), a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(14) Some or all of the constituent elements constituting the devices in the foregoing embodiments may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions thereof by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as IC (Integrated Circuit), LSI, super LSI, ultra LSI, and so on may be used, depending on the level of integration. Further, the manner in which the circuit integration is achieved is not limited to LSIs, and it is also possible to use a dedicated circuit or a general purpose processor. An FPGA (Field Programmable Gate Array) capable of post-production programming or a reconfigurable processor in which the connections and settings of the circuit cells within the LSI can be reconfigured may be used as well.

Further, if other technologies that improve upon or are derived from semiconductor technology enable integration technology to replace LSI circuits, then naturally it is also possible to integrate the function blocks using that technology. Biotechnology applications are one such foreseeable example.

(15) Some or all of the constituent elements constituting the foregoing devices may be constituted by IC cards or stand-alone modules that can be removed from and mounted in the apparatus. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(16) The present disclosure may be realized by the methods described above. This may be a computer program that implements these methods on a computer, or a digital signal constituting the computer program.

Additionally, the present disclosure may also be computer programs or digital signals recorded in a computer-readable recording medium such as a flexible disk, a hard disk, a CD-ROM, an MO, a DVD, a DVD-ROM, a DVD-RAM, a BD (Blu-ray (registered trademark) Disc), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

Additionally, the present disclosure may be a computer system including a microprocessor and memory, where the memory records the above-described computer program and the microprocessor operates in accordance with the computer program.

Additionally, the present disclosure may be implemented by another independent computer system, by recording the program or the digital signal in the recording medium and transferring the recording medium, or by transferring the program or the digital signal over the network or the like.

(17) The above-described embodiments and variations may be combined as well.

Additionally, these techniques can be realized as a method that includes some or all of the steps of processing executed by each constituent element in each of the foregoing embodiments or variations thereon, or as a program that is executed by a processor of a device control command monitoring system to cause the device control command monitoring system to implement the method. For example, processing executed by a specific constituent element in the foregoing embodiments or variations thereon may be executed by a different constituent element instead of the specific constituent element. Additionally, the order of multiple processes may be changed, and multiple processes may be executed in parallel.

INDUSTRIAL APPLICABILITY

The present disclosure is useful in, for example, networks in which appliances and devices aside from appliances are connected.

The invention claimed is:

1. A device monitoring method performed in a network system, the network system having a plurality of devices, the plurality of devices including a first device and a second device, the first device and the second device being connected to a communication network, the device monitoring method comprising:
receiving a message addressed to the second device from the first device, the message being transmitted from the first device to the second device;
determining whether the message received from the first device contains a device control command that controls the second device;
determining whether or not to transmit the message to the second device based on a predetermined condition, in response to a determination result that the message contains the device control command; and
transmitting the message to the second device, in response to the predetermined condition being satisfied,
wherein the predetermined condition includes a first condition that the first device, that is a source of transmission of the message addressed to the second device, is registered as having a predetermined function in a device list, the device list containing information about whether or not each of the plurality of devices has the predetermined function,
the predetermined condition further includes a second condition that one of a first operating state of the second device after being controlled by the device control command and a second operating state of the second device before being controlled by the device control command is a pre-set operating state, and
the determining, of whether or not to transmit the message to the second device, further determines to transmit the message in response to the second condition being satisfied.

2. The device monitoring method according to claim 1, further comprising:
updating the second operating state of the second device in a state list to the first operating state of the second device after being controlled by the device control command, in response to the second condition being satisfied.

3. The device monitoring method according to claim 1, wherein the plurality of devices is installed in a structure, and
the second condition further includes that a user is in a predetermined room among a plurality of rooms in the structure at a point in time of the determining whether or not to transmit the message to the second device.

4. The device monitoring method according to claim 1, wherein the predetermined function includes supporting a predetermined communication protocol in the communication network.

5. The device monitoring method according to claim 4, wherein the predetermined communication protocol is a communication protocol for short-range wireless communication.

6. The device monitoring method according to claim 1, wherein the second device is a household appliance, and the device control command is for controlling the household appliance.

7. The device monitoring method according to claim 1, wherein each of the plurality of devices is provided in a home.

8. A non-transitory computer-readable recording medium having a program recorded thereon for causing a computer to execute the device monitoring method according to claim 1.

9. A device monitoring method performed in a network system, the network system having a plurality of devices, the plurality of devices including a first device and a second device, the first device and the second device being connected to a communication network, the device monitoring method comprising:
receiving a message addressed to the second device from the first device, the message being transmitted from the first device to the second device;
determining whether the message received from the first device contains a device control command that controls the second device;
determining whether or not to transmit the message to the second device based on a predetermined condition, in response to a determination result that the message contains the device control command; and
transmitting the message to the second device, in response to the predetermined condition being satisfied,
wherein the predetermined condition includes a first condition that the first device, that is a source of transmission of the message addressed to the second device, is registered as having a predetermined function in a device list, the device list containing information about whether or not each of the plurality of devices has the predetermined function, and
the determining, of whether or not to transmit the message to the second device, further determines whether or not the second device has the predetermined function in response to the first condition not being satisfied, and determines to transmit the message to the second device in response to the second device not having the predetermined function.

10. A device monitoring method performed in a network system, the network system having a plurality of devices, the plurality of devices including a first device and a second device, the first device and the second device being connected to a communication network, the device monitoring method comprising:
receiving a message addressed to the second device from the first device, the message being transmitted from the first device to the second device;
determining whether the message received from the first device contains a device control command that controls the second device;
determining whether or not to transmit the message to the second device based on a predetermined condition, in response to a determination result that the message contains the device control command; and
transmitting the message to the second device, in response to the predetermined condition being satisfied,
wherein the predetermined condition includes a first condition that the first device, that is a source of transmission of the message addressed to the second device, is registered as having a predetermined function in a device list, the device list containing information about whether or not each of the plurality of devices has the predetermined function,
the predetermined condition further includes a third condition that the first device is connected to a first connection port to which a device having the predetermined function is connected, and
the determining, of whether or not to transmit the message to the second device, further determines to transmit the message to the second device in response to the third condition being satisfied.

11. The device monitoring method according to claim 10, wherein the determining, of whether or not to transmit the message to the second device, further determines whether or not the first device is allowed to communicate with the second device in response to the third condition not being satisfied, and determines to transmit the message to the second device in response to the first device being allowed to communicate with the second device.

12. The device monitoring method according to claim 10, further comprising:
classifying each of the plurality of devices as having or not having the predetermined function,
wherein, in the classifying, a predetermined terminal is notified in response to the second device having the predetermined function and the second device being connected to a second connection port different from the first connection port or in response to the second device not having the predetermined function and the second device being connected to the first connection port.

13. The device monitoring method according to claim 10, further comprising:
classifying each of the plurality of devices as having or not having the predetermined function,
wherein the first device is connected to the first connection port and does not have the predetermined function, the second device is connected to the first connection port and has the predetermined function,
a gateway is connected to the second device and is capable of executing processing of the determining whether or not to transmit the message to the second device, and
in the classifying, the message is transmitted from the first device to the second device via the gateway, in response to the first device and the second device not being allowed to communicate.

14. A device monitoring method performed in a network system, the network system having a plurality of devices, the plurality of devices including a first device and a second device, the first device and the second device being connected to a communication network, the device monitoring method comprising:
receiving a message addressed to the second device from the first device, the message being transmitted from the first device to the second device;
determining whether the message received from the first device contains a device control command that controls the second device;
determining whether or not to transmit the message to the second device based on a predetermined condition, in response to a determination result that the message contains the device control command; and
transmitting the message to the second device, in response to the predetermined condition being satisfied,
wherein the predetermined condition includes a first condition that the first device, that is a source of transmission of the message addressed to the second device, is registered as having a predetermined function in a device list, the device list containing information about whether or not each of the plurality of devices has the predetermined function,
the device monitoring method further comprises:
generating the device list based on a response message responding to a determination message transmitted to each of the plurality of devices, the determination message being for determining whether or not each of the plurality of devices has the predetermined function; and
updating the device list generated in the generating of the device list, and the updating of the device list includes:
transmitting the determination message to each of the plurality of devices;
receiving the response message in response to each determination message;
determining whether or not a determination result indicating whether or not a device has the predetermined function based on the response message matches registration information of the device in the device list; and
updating a registration state of the device in the device list based on the determination result in response to the determination result not matching the registration information.

15. A device monitoring apparatus in a network system, the network system having a plurality of devices, the plurality of devices including a first device and a second device, the first device and the second device being connected to a communication network, the device monitoring apparatus comprising:
a processor; and
a memory including a program, the program, when executed by the processor, causing the processor to:
receive a message addressed to the second device from the first device, the message being transmitted from the first device to the second device;
determine that the message received from the first device contains a device control command that controls the second device;
determine whether or not to transmit the message to the second device based on a predetermined condition, in response to the message containing the device control command; and
transmit the message to the second device, in response to the predetermined condition being satisfied,
wherein the predetermined condition includes a first condition that the first device, that is a source of transmission of the message addressed to the second device, is registered as having a predetermined function in a device list, the device list containing information about whether or not each of the plurality of devices has the predetermined function,
the predetermined condition further includes a second condition that one of a first operating state of the second device after being controlled by the device control command and a second operating state of the second device before being controlled by the device control command is a pre-set operating state, and
the processor further determines, in determining whether or not to transmit the message to the second device based on the predetermined condition, to transmit the message in response to the second condition being satisfied.

16. A device monitoring apparatus in a network system, the network system having a plurality of devices, the plurality of devices including a first device and a second device, the first device and the second device being connected to a communication network, the device monitoring apparatus comprising:
a processor; and
a memory including a program, the program, when executed by the processor, causing the processor to:
receive a message addressed to the second device from the first device, the message being transmitted from the first device to the second device;

determine that the message received from the first device contains a device control command that controls the second device;

determine whether or not to transmit the message to the second device based on a predetermined condition, in response to the message containing the device control command; and transmit the message to the second device, in response to the predetermined condition being satisfied, wherein the predetermined condition includes a first condition that the first device, that is a source of transmission of the message addressed to the second device, is registered as having a predetermined function in a device list, the device list containing information about whether or not each of the plurality of devices has the predetermined function, and the processor further determines, in determining whether or not to transmit the message to the second device based on the predetermined condition, whether or not the second device has the predetermined function in response to the first condition not being satisfied, and determines to transmit the message to the second device in response to the second device not having the predetermined function.

17. A device monitoring apparatus in a network system, the network system having a plurality of devices, the plurality of devices including a first device and a second device, the first device and the second device being connected to a communication network, the device monitoring apparatus comprising:

a processor; and a memory including a program, the program, when executed by the processor, causing the processor to:
receive a message addressed to the second device from the first device, the message being transmitted from the first device to the second device;

determine that the message received from the first device contains a device control command that controls the second device;

determine whether or not to transmit the message to the second device based on a predetermined condition, in response to the message containing the device control command; and transmit the message to the second device, in response to the predetermined condition being satisfied, wherein the predetermined condition includes a first condition that the first device, that is a source of transmission of the message addressed to the second device, is registered as having a predetermined function in a device list, the device list containing information about whether or not each of the plurality of devices has the predetermined function, the predetermined condition further includes a third condition that the first device is connected to a first connection port to which a device having the predetermined function is connected, and the processor further determines, in determining whether or not to transmit the message to the second device based on the predetermined condition, to transmit the message to the second device in response to the third condition being satisfied.

18. A device monitoring apparatus in a network system, the network system having a plurality of devices, the plurality of devices including a first device and a second device, the first device and the second device being connected to a communication network, the device monitoring apparatus comprising:

a processor; and a memory including a program, the program, when executed by the processor, causing the processor to:
receive a message addressed to the second device from the first device, the message being transmitted from the first device to the second device;

determine that the message received from the first device contains a device control command that controls the second device;

determine whether or not to transmit the message to the second device based on a predetermined condition, in response to the message containing the device control command; and transmit the message to the second device, in response to the predetermined condition being satisfied, wherein the predetermined condition includes a first condition that the first device, that is a source of transmission of the message addressed to the second device, is registered as having a predetermined function in a device list, the device list containing information about whether or not each of the plurality of devices has the predetermined function the program further causes the processor to:
generate the device list based on a response message responding to a determination message transmitted to each of the plurality of devices, the determination message being for determining whether or not each of the plurality of devices has the predetermined function; and update the device list, and updating of the device list includes:
transmitting the determination message to each of the plurality of devices;

receiving the response message in response to each determination message;

determining whether or not a determination result indicating whether or not a device has the predetermined function based on the response message matches registration information of the device in the device list; and updating a registration state of the device in the device list based on the determination result in response to the determination result not matching the registration information.

* * * * *